United States Patent
Kurokawa et al.

(10) Patent No.: US 6,741,055 B2
(45) Date of Patent: May 25, 2004

(54) POSITIONING-CONTROLLING APPARATUS AND POSITIONING-CONTROLLING METHOD, AND PART-MOUNTING EQUIPMENT AND PART-MOUNTING METHOD

(75) Inventors: Takahiro Kurokawa, Kofu (JP); Yoichi Tanaka, Yamanashi-ken (JP); Seiichi Matsuo, Kofu (JP); Seishiro Yanachi, Kofu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 51 days.

(21) Appl. No.: 10/025,890

(22) Filed: Dec. 26, 2001

(65) Prior Publication Data

US 2002/0084762 A1 Jul. 4, 2002

(30) Foreign Application Priority Data

Dec. 26, 2000 (JP) ........................................ 2000-394441

(51) Int. Cl.[7] .............................................. G05B 11/01
(52) U.S. Cl. ..................... 318/560; 318/618; 318/625; 318/632; 318/565; 901/9
(58) Field of Search ............................. 318/560, 618, 318/625, 632, 565; 700/90, 245; 901/9

(56) References Cited

U.S. PATENT DOCUMENTS

| | | | | |
|---|---|---|---|---|
| 5,610,489 A | * | 3/1997 | Hart et al. ................... | 318/571 |
| 5,952,804 A | * | 9/1999 | Hamamura et al. .......... | 318/560 |
| 6,022,132 A | * | 2/2000 | Schultz ................... | 364/474.28 |
| 6,097,168 A | * | 8/2000 | Katoh et al. ........... | 318/568.11 |
| 6,157,157 A | * | 12/2000 | Prentice et al. ............. | 318/625 |

* cited by examiner

Primary Examiner—Rina Duda
Assistant Examiner—Tyrone Smith
(74) Attorney, Agent, or Firm—Wenderoth, Lind & Ponack L.L.P.

(57) ABSTRACT

There are provided a positioning-controlling apparatus and a positioning-controlling method in which a rotary encoder (2) detects the Z phase before the subject (4) is return to the origin which is the position of the Z phase detected by the linear encoder (5). The driving mode of the servo motor (1) is switched from rectangular waveform pulse driving to sine waveform pulse driving upon the detection of the Z phase by the rotary encoder (2). The subject's moving direction for returning to the origin may be previously specified, and in which the detection of the ON state of the origin sensor (11), the detection of the Z phase by the rotary encoder (2), and the detection of the Z phase by the linear encoder (5) are done in this order, while the subject (4) is being moved in the above specified direction. Alternatively, the rotary encoder (2) may detect the CS phase instead of the Z phase.

12 Claims, 13 Drawing Sheets

POSITIONING-CONTROLLING APPARATUS AND POSITIONING-CONTROLLING METHOD, AND PART-MOUNTING EQUIPMENT AND PART-MOUNTING METHOD

BACKGROUND OF THE INVENTION

The present invention relates to a positioning-controlling apparatus for positioning a subject by moving it to a predetermined position and a positioning-controlling method, and part-mounting equipment and a part-mounting method which comprise the positioning-controlling apparatus or employ the positioning-controlling method.

In part-mounting equipment for continuously mounting parts such as electronic parts, etc. on determined positions of a circuit-formed material such as an electronic circuit substrate or the like, a part is mounted on a determined position of a circuit-formed material by introducing the circuit-formed material into the equipment and regulating and holding it, while carrying and positioning a part at a determined position of the circuit-formed material, and mounting the part thereon. Alternatively, if a position to receive a part is specified, a circuit-formed material is carried and positioned so as to mount the part on a determined position of the circuit-formed material at the above specified position. FIG. 7 shows an essential portion of part-mounting equipment comprising the former type positioning means which carries a part and positions it.

As seen in FIG. 7, part-mounting equipment (100) essentially consists of a part-supplying unit (50) for supplying parts to the part-mounting equipment (100), a robot (60) for carrying a subject on an X-Y plane, a mounting head (75) to be carried by the robot (60), a circuit-formed material-holding device (80) for carrying and holding a circuit-formed material, and a controller (90) for controlling the overall operation of the part-mounting equipment (100).

The robot (60) comprises a Y-direction driving unit which causes motors (62 and 64) fixed on the equipment to move a beam (70) along ball screws (63 and 64) in the direction Y, and an X-direction driving unit which causes a motor (72) fixed on the beam (70) driven by the Y-direction driving unit to move the mounting head (75) along a ball screw (73) in the direction X. In this regard, although the Y-direction driving unit may comprise a system in which driving is performed using one motor and one ball screw, Y-direction driving units of a multi-screw driving system (in this drawing, a twin-screw type using two ball screws (63 and 65)) have come into wide use to meet the latest demand for high-speed and high-load mounting performance, and also to achieve high rigidity and high accuracy of equipment.

As seen in FIG. 7, the mounting head (75) has 4 mounting nozzles (76) which are movable up and down along the direction Z and rotatable on the axis Z as the center. By this motion of the nozzles (76), parts are taken out and mounted. The circuit-formed material-holding device (80) carries a circuit-formed material such as an electronic circuit substrate (82) as shown in FIG. 7 into the part-mounting equipment and regulates and holds the substrate (82) at a predetermined position in the course of mounting the part.

The part-mounting equipment (100) arranged above is operated as follows. The mounting head (75) with the respective mounting nozzles (76) which suck parts from the part-supplying unit (50) and hold them is carried to a mounting position by the robot (60), while the circuit-formed material-holding device (80) introduces the electronic circuit substrate (82) and holds it at a predetermined position. The distance which the robot (60) travels carrying the mounting head is computed and controlled by the controller (90) based on the data of a condition of the part sucked and held by the mounting nozzle (76), which is separately recognized, and data of a condition of the electronic circuit substrate (82) held. The mounting head (75), which is moved to the mounting position and stopped there, lowers the mounting nozzles (76) so as to mount the parts sucked at the ends of the nozzles (76) on the mounting positions of the electronic circuit substrate (82).

Part-mounting equipment is typically provided with a positioning-controlling apparatus for moving a subject (the mounting head (75) in the case of the X-direction driving unit shown in FIG. 7) in a predetermined direction along the ball screw which is rotated by a servo motor, and positioning it at a predetermined position and stopping it there. The system for detecting the position of the subject in this positioning-controlling apparatus is classified as a rotary encoder system in which the position of a subject is detected based on the number of rotations of a rotary encoder which rotates coaxially with a servo motor shaft, and a linear encoder system in which a position of a linear scale attached parallel to a direction along which a subject is moving is detected by a linear position-detecting device attached on the subject.

Recently, techniques for miniaturizing parts have been advanced, and hence high-density mounting of parts on an electronic circuit substrate has been realized. Therefore, accurate positioning and mounting of parts are required for part-mounting equipment. Under such circumstances, a positioning-controlling apparatus for use in part-mounting equipment tends to employ the linear encoder system capable of more accurately detecting a position of a subject than the rotary encoder system. The linear encoder is further classified as one of two types: one is an absolute type encoder which detects an absolute position by counting, and the other is an incremental type encoder which detects a relative position by counting. Of these encoders, presently, the incremental type encoder is mainly used because of its reliability and its past achievement. A positioning-controlling apparatus using this incremental type linear encoder according to the prior art is described with reference to the accompanying drawings.

FIG. 8 schematically shows the arrangement of a positioning-controlling apparatus according to the prior art which uses the incremental type linear encoder (hereinafter, simply referred to as a linear encoder). The system shown in FIG. 8 may be considered as the essential portion of the X-direction driving unit used by the part-mounting equipment (100) shown in FIG. 7. As seen in FIG. 8, mounted on the servo motor (1) is a moving mechanism comprising a ball screw (3) for moving a subject (an object) (4), and a moving member (7) screwed on the ball screw (3). The subject (4) (the mounting head (75) in the case of the X-direction driving unit shown in FIG. 7) is secured on the moving member (7), and the subject (4) is moved in the direction R or L via the rotation of the ball screw (3) by the reciprocal rotation of the servo motor (1). The subject (4) is equipped with a linear encoder (5) which performs position detection by detecting a linear scale (6) secured parallel to the ball screw (3). A rotary encoder (2) which rotates together with the servo motor (1) to detect a rotation amount is coaxially mounted on the servo motor (1).

At the time of turning on a power supply, the servo motor (1) using the linear encoder (5) as a position-detecting means cannot grasp an absolute position of the subject (4).

Therefore, the subject (4) needs to be returned to an origin position which is preset as a reference position, and then a relative position from the origin position is detected by counting output signals from the linear encoder (5) so as to make positioning control. A detection piece (8) is attached to the moving member (7) on which the subject (4) is mounted, so as to detect the returning of the subject (4) to the origin position. Further, an origin sensor (11) is arranged at the origin position, and the sensor (11) detects the detection piece (8) which has been moved to the origin position.

The servo driver (10) controls the rotation of the servo motor (1) according to an instruction from the controller (9) which controls the overall operation of the equipment, and also according to a detection signal from the origin sensor (11) and output signals from the rotary encoder (2) and the linear encoder (5). Inside the servo driver (10), generally, the velocity of the servo motor (1) is detected based on the position data from the rotary encoder (2) and the detected velocity is used for computation of the velocity of the servo loop, and the position data from the linear encoder (5) is used for computation of the position of the servo loop. However, in the case in which a moving mechanism for the subject (4), for example, a vibrating component such as the ball screw (3), is included, the position data and the velocity data from the linear encoder alone may be used for computation of the servo loop.

Next, the subject's origin returning operation by the positioning-controlling apparatus shown in FIG. 8 is described with reference to the flowchart shown in FIG. 9. The origin returning operation starts when the controller (9) instructs the servo driver (10) to move the subject (4) in a predetermined direction at Step S1. The servo driver (10) simultaneously starts an origin sensor-retrieving operation for monitoring the input of a reference position signal (a signal to be inputted when the origin sensor detects the detection piece attached to the moving member (hereinafter referred to as the ON state of the origin sensor)) from the origin sensor (11) at Step S2. At this point in time, if the subject keeps moving because the Z phase is not detected by the linear encoder at Step S5 (No) after the origin sensor (11) has already entered the ON state (Yes) at Step S2, and if the origin sensor (11) then enters the OFF state (No) at Step S2, it is decided at Step S3 that the origin sensor (11) has once entered the ON state and then enters the OFF state. In this case, the moving direction is inverted at Step S4. If a condition for completing the origin returning operation is established at Step S5 (in other words, if the AND condition of the detection of the Z phase by the linear encoder and the ON state of the origin sensor is established), the servo driver (10) stops the moving operation at Step S6, and the controller (9) stops the instruction and completes the subject's origin returning operation.

In the positioning-controlling apparatus with the above arrangement, the origin is defined as a position of the Z phase detected by the linear encoder (5), which is capable of accurately detecting the position of the subject (4). On the other hand, the Z phase detected by the rotary encoder (2) is used as a reference for generating an electrical current instruction with sine waveform pulses for driving the servo motor (1). That is, the position of the Z phase detected by the linear encoder (5) is used to determine the position of a spatial absolute reference origin, and the position of the Z phase detected by the rotary encoder (2) is used to determine an electrical origin (a reference for determining timing for an electrical waveform which composes an operational instruction to the servo motor, that is, a reference for synchronization of servo control) necessary for controlling the servo motor (1).

Next, a method of driving the servo motor (1) is described with reference to FIGS. 10 and 11. The servo motor (1) is driven according to rectangular waveform pulses as shown in the lower half of FIG. 10, based on a CS phase (commutation signal phase) which is outputted in accordance with positive or negative induced voltage of the motor. That is, when the position of the subject (4) is present at, for example, position A shown in FIG. 10, CS signals 1 and 3 are in the ON state, which leads to a control for allowing current to flow on U, W. When the servo motor (1) is present at position B in FIG. 10, CS signals 1 and 2 are in the ON state, and a control for allowing a current to flow on U, V is performed.

The above CS phase is a generic name of CS1 to CS3. Specifically, CS1 is a rectangular waveform pulse corresponding to positive or negative induced U-W. Similarly, CS2 is a rectangular waveform pulse corresponding to positive or negative induced voltage V-U, and CS3 is a rectangular waveform pulse corresponding to positive or negative induced voltage W-V. As shown in FIG. 11, in the servo motor, the notations U, V and W refer to motor power lines for three-phase driving. In detail, U-W indicates the induced voltage of the motor power line U obtained when the power line W is grounded (represented by G). Similarly, V-U indicates the induced voltage of the power line V obtained when the power line U is grounded, and W-V indicates the induced voltage of the power line W obtained when the power line V is grounded. The driving by rectangular waveform pulses is employed for constructing a motor at lower cost because the driving control is possible only by using a combination of the above three CS signals alone, which leads to simple driving, or it is employed for driving before the completion of the subject's origin returning operation just after the power supply is turned on, as mentioned above. This driving mode, however, may not be employed for the essential use of the servo motor (1) for performing high-speed and high-accuracy driving, because of the limited performance by this driving mode.

To solve this problem, the performance of the servo motor (1) is drawn by sine waveform pulse driving. The sine waveform pulse driving is carried out as follows. The Z phase detected by the rotary encoder (2) is defined as a reference for an electrical origin of the servo motor (1), and an electrical distance from this electrical origin is computed based on the A phase and B phase from the rotary encoder (2). The result is outputted as a sine waveform pulse current instruction in proportion to the induced voltage from the servo motor (1) as shown in the upper half of FIG. 10. In FIG. 10, the position of the Z phase detected by the rotary encoder (2) is caused to coincide with the rise of the CS 1 signal, and it is possible to estimate an electrical axial position of the servo motor (1) from the position of the Z phase and the count values of the A phase and the B phase per one rotation of the rotary encoder (2). Thus, the sine waveform pulse driving of the servo motor (1) becomes possible. This sine waveform pulse driving is suitable for high-accuracy driving because an electrical angle can be found by an encoder resolution per one rotation, so that it becomes possible to increase the acceleration and to use the servo motor up to the uppermost limit of its performance. The sine waveform pulse driving is generally performed in part-mounting equipment, because the rectangular waveform pulse driving of the servo motor (1) makes it hard to reduce the positioning-settling time and to achieve constant velocity required for recognition of parts. However, the reference for sine waveform pulse can not be obtained before the Z phase is detected by the rotary encoder (2), as in the case immediately after the power supply is turned on. Therefore, the sine waveform pulse driving may not be realized during such a time frame. In such a case, the foregoing rectangular waveform pulse driving is performed until the Z phase is detected by the rotary encoder (2). Then, at a point of time when the rotary encoder (2) detects the Z phase, the sine waveform pulse driving becomes possible, and the driving is switched to the sine waveform pulse driving.

The conventional servo motor (1) is equipped with the rotary encoder (2) capable of detecting A phase and B phase for use in detecting a rotation angle, Z phase for indicating the position of the origin, and CS1 to CS3 phases corresponding to positive or negative of induced voltage of the motor. If the servo motor (1) is provided on the above positioning-controlling apparatus or the like, the linear encoder (5), in many cases, is used for controlling a position and velocity in the servo loop and detecting an absolute origin position. Therefore, it is rare to provide the linear encoder (5) for detecting an electrical origin and CS phases because of the difficulties in adjustment thereof.

The operation of part-mounting equipment provided with the above positioning-controlling apparatus is described with reference to the flowchart shown in FIG. 12 in conjunction with FIG. 7 already described above.

As mentioned above, the latest part-mounting equipment is required to meet the demand of high-speed and high-accuracy performance in association with miniaturization of parts. To solve this problem, advanced synchronous control employing multi-axial driving such as twin-axial driving is used, especially for the Y-direction driving unit of the robot (60). In this example, the synchronous control of the motor (62) and the motor (64) of the above Y-direction driving unit for the Y-directional operation of the beam (70) which supports the mounting head (75) is described. When the power supply is turned on, the current positions of the motors (62 and 64) are not known, and therefore, they are caused to return to the origin positions, respectively. This origin-resuming operation is carried out according to the method disclosed in Laid-Open Japanese Patent Publication No. 11-J45694/1999 or the like. The summary of the method is illustrated in the flowchart shown in FIG. 12. The flowchart of FIG. 12 illustrates a case in which the origin-resuming operation described in the flowchart of FIG. 9 is essentially performed on each of the plurality of axes. That is, at Steps S15 and S21 of the flowchart on FIG. 12, the origin positions of the mounting head (75) as the subject (4) are independently detected relative to the motors (62 and 64) so as to complete the mounting head's returning to the origins on the respective ball screws (63 and 65), and thus, at Steps S16 and S22, the subject's returning to the origins on the twin axes are completed. In this connection, the acceleration and the velocity of the motors at the time of the origin returning operation are controlled lower on the assumption that the rectangular waveform pulse driving should be done, and therefore, the performance of the motors may not be important at the time of the origin-returning operation.

However, the positioning control according to the prior art described above has the following problem. There is a possibility that the subject's origin-returning may be completed before the rotary encoder detects the Z phase, depending upon a position at which the origin-returning operation is started or upon a subject's moving direction. This is because the condition of completing the origin-returning operation is based on the AND condition of "detection of the Z phase by the linear encoder" and "the ON state of the origin sensor". The situation of this origin-returning operation is described in detail with reference to FIG. 13. Assuming that the position of the subject (4) when the power supply is turned on is at P1 on FIG. 13, and the subject's returning direction to the origin is negative (the left direction on the drawing). Under such an assumption, the subject (4) starts returning to the origin, and keeps moving when the rotary encoder (2) first detects the Z phase (indicated by the notation X) and then stops when the linear encoder (5) detects the Z phase. Thus, the subject's origin returning is completed. In this case, the driving mode of the servo motor (1) is switched to the sine waveform pulse driving from the rectangular waveform pulse driving at a point of time when the rotary encoder (2) has detected the Z phase once, as shown in FIG. 13. Therefore, the servo motor (1) can be driven at high acceleration or deceleration and at high velocity so as to control the positioning after the completion of the subject's origin returning, because this driving is done according to the sine waveform pulses obtained after the above switching. Thus, the driving of the apparatus which drives the subject (4) is performed without any problem.

In another case in which the position of the subject (4) when the power supply is turned on is at the position P2 on FIG. 13 and the direction of the subject's returning to the origin is positive (the right direction on the drawing), the subject (4) keeps moving until the linear encoder (5) detects the Z phase, while the rotary encoder (2) does not detect the Z phase at all. Thus, the subject's returning to the origin is completed at the time of the detection of the Z phase by the linear encoder (5). In other words, in spite of the completion of the subject's returning to the origin, the servo motor (1) is still driven according to rectangular waveform pulses, because the rotary encoder (2) does not yet detect the Z phase. In this case, if the subject's moving direction is negative as shown in FIG. 13 in the positioning operation after the completion of the subject's returning to the origin, it is understood that the servo motor (1) is still driven according to rectangular waveform pulses for a period of time while the rotary encoder (2) rotates once at the most until the first Z phase is detected by the rotation of the rotary encoder (2). After that, just when the rotary encoder (2) detects the Z phase, the rotating servo motor (1) is abruptly driven according to sine waveform pulses which are switched from the rectangular waveform pulses.

In actual part-mounting equipment, the first origin returning operation just after the power supply is turned on is performed while acceleration and velocity are lower, assuming the driving in accordance with rectangular waveform pulses. Therefore, the equipment is operated without any problem, even if driven according to rectangular waveform pulses. However, the positioning-controlling operation after the completion of the subject's origin returning is performed at high acceleration and high speed. Under such a condition, if the servo motor (1) is still driven according to rectangular waveform pulses, abnormal noises occur and constant velocity is lost. Thus, the servo motor (11) can not perform the essential positioning control. Further, if the driving mode of the servo motor (1) accelerating is switched from the rectangular waveform pulse driving to the sine waveform pulse driving, a rapid change in torque arises, which leads to occurrence of abnormal noises and pulsating speed.

As mentioned above, in order for the latest part-mounting equipment to meet the demand of high-speed and high-accuracy performance, the advanced synchronous control by multi-axial driving such as twin-axial driving is done on the robot. If the above linear encoder system positioning-control according to the prior art is applied to such synchronous control, a highly synchronizing operation becomes impossible during the acceleration step, depending on the condition of completing the origin returning operations on the multiple screws. As a result, the beam (70) (see FIG. 7) may be twisted in the X-axial direction, which adversely influences the accuracy and lifetime of the equipment. Particularly when the power supply of the part-mounting equipment is turned off, the subject is generally returned to the origin position or around the origin position in order to prevent interference among the axes. By doing so, in most cases, the mounting head as the subject is positioned at or around the origin of the linear scale when the power supply is turned on the next time. When the power supply is again turned on under this condition so as to carry out the first subject's origin returning operation, such events frequently occur that the linear encoder detects the Z phase before the rotary encoder detects the Z phase, thereby completing the subject's origin returning. This provides a serious problem in that adverse influences inevitably impact the accuracy and lifetime of the beam (70) along the direction X at every time when the power supply is turned on. Under these circumstances, an advanced positioning-controlling apparatus capable of solving the foregoing problems is desired.

SUMMARY OF THE INVENTION

The present invention is made in order to solve the above-mentioned problems by adding, to the condition of completing the subject's origin returning operation, a condition that the rotary encoder should detect the Z phase prior to the Z phase detection by the linear encoder, in a positioning-controlling process. Specifically, the present invention provides the following.

One aspect according to the present invention relates to a positioning-controlling apparatus which comprises a servo motor, a servo driver for controlling the driving of the servo motor, a rotary encoder for detecting the rotation amount of the servo motor, a moving mechanism driven by the rotation of the servo motor, and a linear encoder for detecting the moving amount of the moving mechanism. The servo driver detects, from the rotary encoder, a CS phase necessary for driving the servo motor, and generates a current instruction with rectangular waveform pulses which are obtained from the CS phase from the rotary encoder until the time when the rotary encoder detects a Z phase or the linear encoder detects a Z phase. After the rotary encoder detects the Z phase or the linear encoder detects the Z phase, the servo driver generates a current instruction with sine waveform pulses based on the Z phase detected by the rotary encoder, thereby switching the driving mode of the servo motor. At the time of turning on a power supply, the servo driver returns a subject to be moved by the moving mechanism to an origin position which is the position of the Z phase detected by the linear encoder, and then, moves the subject to a required position and stops it there for positioning. The rotary encoder detects the Z phase previously in the operation of returning the subject to the origin. By adding the condition that the rotary encoder should previously detect the Z phase to the condition of completing the subject's return to the origin position, the driving of the servo motor for positioning the subject can be previously switched to the driving according to sine waveform pulses.

The above subject is completely returned to the origin and stopped there under the condition that, while the subject is being moved by the moving mechanism to return to the origin position, an origin sensor first detects that the subject is within a detectable region of the origin sensor, and the rotary encoder detects the Z phase. Then, the linear encoder detects the Z phase, while the subject is moving within the above detectable region.

The subject is not completely returned to the origin and continues to move under the condition that, while the subject is being moved by the moving mechanism to return to the origin position, the origin sensor first detects that the subject is within the detectable region of the origin sensor, and the linear encoder "detects" (i.e., encounters) the Z phase before the rotary encoder detects the Z phase while the subject is moving within the above detectable region. Thus, the linear encoder ignores the Z phase, so that the Z phase is not detected by the linear encoder at this time. The subject is completely returned to the origin and stopped there under the condition that the subject is kept moving to leave the above detectable region and is then moved in the reverse direction to again enter the detectable region. Thus, the rotary encoder detects the Z phase and the linear encoder detects the Z phase in this order, while the subject is moving within the above detectable region.

In a positioning-controlling apparatus according to another aspect of the present invention, the subject is moved by the moving mechanism to return to the origin which is the position of the Z phase detected by the linear encoder, as follows. The subject's moving direction for returning to the origin position is predetermined, and the origin sensor, the Z phase to be detected by the rotary encoder and the Z phase to be detected by the linear encoder are adjusted so that, while the subject is moving to the predetermined direction, the origin sensor can first detect that the subject is within the above detectable region, then that the rotary encoder detects the Z phase, and then that the linear encoder can detect the Z phase.

In the positioning-controlling apparatus according to the above aspect, if one end of the subject's movable region coincides with one end of the above detectable region, the Z phase to be detected by the linear encoder and the Z phase to be detected by the rotary encoder are arranged so that first the rotary encoder detects the Z phase and then the linear encoder detects the Z phase while the subject is moved toward the one end of the above detectable region from the other end thereof.

Further, when the position of the above subject at the start of the subject's origin returning operation is outside of the above detectable region, the subject may be moved in a predetermined direction specified as the moving direction for returning to the origin position, so as to be returned to the origin.

Further, when the position of the subject at the start of the subject's origin returning operation is within the detectable region, the subject may be moved in a direction reverse to the predetermined direction specified as the moving direction for returning to the origin position, so as to leave the above detectable region, and then be moved in the reverse direction which is the above predetermined direction, so as to be returned to the origin position.

In a positioning-controlling apparatus according to yet another aspect of the present invention, an offset amount and an offset direction, which are the distance and the moving direction from the position where the rotary encoder detects the Z phase to the position where the linear encoder detects the Z phase, are predetermined. The above servo driver switches the driving mode according to the current instruction with rectangular waveform pulses to the driving mode according to the current instruction with sine waveform pulses, when the subject is moved in the offset direction by the offset amount from the position where the rotary encoder detects the Z phase. In this aspect, the current instruction with rectangular waveform pulses is not immediately switched to the current instruction with sine waveform pulses even when the rotary encoder detects the Z phase, and this switching is executed when the linear encoder detects the Z phase, or the subject is moved by the offset amount after the Z phase is detected by the rotary encoder.

Yet another aspect according to the present invention relates to part-mounting equipment which comprises a circuit-formed material-holding device for carrying and holding a circuit-formed material, a part-supplying unit for supplying parts, a mounting head capable of taking a part out of the part-supplying unit and mounting the part on the circuit-formed material, a robot for carrying the mounting head, and a controller for controlling the circuit-formed material-holding device, the part-supplying unit, the mounting head, and the robot. With this arrangement, the part taken out of the part-supplying unit by the mounting head is mounted on a mounting position of the circuit-formed material, wherein either or both of the robot and the circuit-formed material-holding device comprise(s) any of the above positioning-controlling apparatuses in order to accurately position the part at the predetermined mounting position of the circuit-formed material.

In this part-mounting equipment, the robot or the circuit-formed material-holding device may comprise a multi-axial driving unit for synchronous operation using a plurality of servo motors, so as to carry the mounting head or the circuit-formed material in a predetermined direction. That is, the positioning-controlling apparatus of the present invention may be applied to part-mounting equipment comprising a multiaxial driving system with high accuracy and high load durability.

A further aspect according to the present invention relates to a positioning-controlling method which comprises the steps of driving a servo motor, which is a driving source for moving a subject, according to a current instruction with rectangular waveform pulses obtained from a CS phase detected by the above rotary encoder until the time when the rotary encoder which detects the rotation amount of the servo motor detects a Z phase or the linear encoder detects a Z phase. The driving mode of the servo motor is switched to a driving mode according to a current instruction with sine waveform pulses based on the Z phase after the rotary encoder detects the Z phase or after the linear encoder detects the Z phase. The subject is returned to the origin position which is the position of the Z phase detected by the linear encoder which detects the moving amount of said subject, and then the subject is moved to a required position so as to position the subject. A condition that the rotary encoder should previously detect the Z phase is added to the condition of completing the subject's origin returning operation. By the addition of this condition, the driving mode of the servo motor is previously switched to the driving mode according to sine waveform pulses for positioning the subject.

In the above positioning-controlling method, the subject's moving direction for returning to the origin position may be predetermined, and the origin sensor, the Z phase to be detected by the rotary encoder, and the Z phase to be detected by the linear encoder may be adjusted so that the origin sensor can first detect that the subject is within the above detectable region. The rotary encoder detects the Z phase and the linear encoder detects the Z phase in this order, while the subject is being moved in the above detectable region. That is, the timing of the detection of the subject by the origin sensor, the detection of the Z phase by the rotary encoder, and the detection of the Z phase by the linear encoder is adjusted so that the driving mode of the servo motor for positioning the subject can be previously switched to the driving mode according to sine waveform pulses before the positioning operation.

A further aspect according to the present invention relates to a part-mounting method which comprises the steps of taking a part out of the part-supplying unit; carrying the part to a mounting position of a circuit-formed material which is regulated and held; positioning the part there; and mounting the part at the mounting position. The foregoing positioning-controlling method is employed for either or both of positioning a mounting head for holding and carrying the part and a holding device for regulating and holding the circuit-formed material, in order to accurately position the part to the predetermined mounting position of the circuit-formed material.

DETAILED DESCRIPTION OF THE INVENTION

The present invention will now be described in more detail by way of embodiments, which, however, should not be construed as limiting the scope of the present invention in any way. Positioning control according to the first embodiment of the present invention is described with reference to the accompanying drawings.

Figure 1:
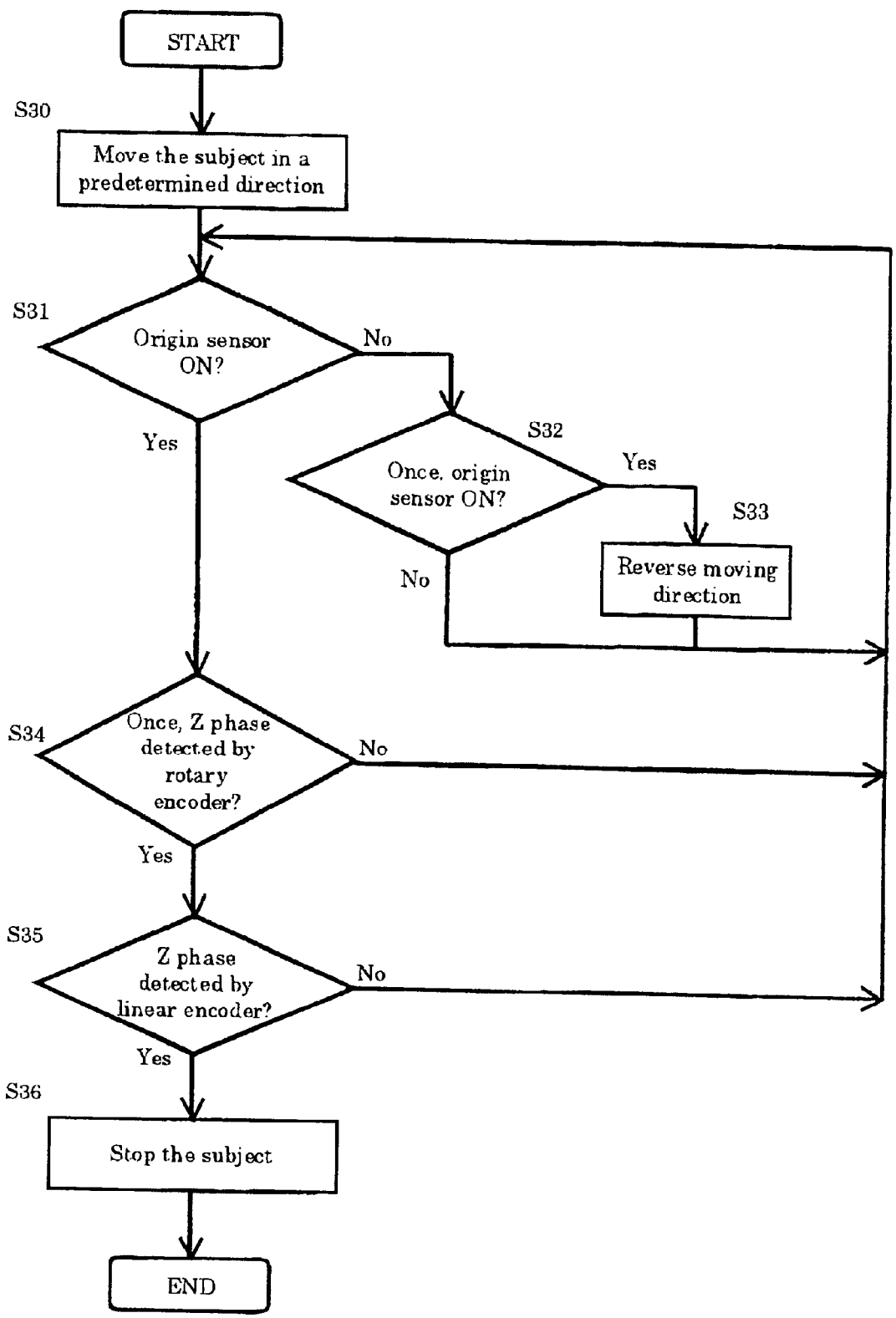
FIG. 1 shows a flowchart illustrating the subject's origin returning operation in positioning control according to an embodiment of the present invention.

FIG. 1 shows a flowchart illustrating an origin position returning operation in positioning control according to the present embodiment. In the description set forth below, components the same as those described with respect to the prior art are referred to by using the same notations. Therefore, the same components are described with reference to the corresponding drawings of the prior art. That is, the arrangement of the positioning-controlling apparatus of the present embodiment is similar to the prior art shown in FIG. 8. However, the origin returning operation in the course of the positioning control by the controller (9) is performed following the flowchart shown in FIG. 1.

The origin returning operation according to the present embodiment shown in FIG. 1 starts when the controller (9) instructs the servo driver (10) to move the subject (4) in a predetermined direction at Step S30. Simultaneously, the servo driver (10) starts retrieving the origin sensor (11) so as to monitor an input of a reference position signal (a signal to be inputted when the origin sensor (11) enters the ON state, i.e., when the origin sensor (11) detects the detection piece) from the origin sensor (11) at Step S31. If the subject (4) keeps moving because the detection of the Z phase by the rotary encoder (2) at Step S34 and the detection of the Z phase by the linear encoder (5) at Step S35 are not achieved after the origin sensor (11) has entered the ON state at Step S31 (Yes), and if the program returns to Step S31 and the origin sensor (11) enters the OFF state (No), it is decided at Step S32 that the origin sensor (11) has entered the ON state once and then entered the OFF state (Yes). In this case, the subject's moving direction is reversed at Step S33. This is done to move the subject (4) in a direction in which the subject (4) may come close to the origin sensor (11).

Next, if the origin sensor (11) enters the state of ON (Yes) at Step S31 and then if the rotary encoder (2) detects the Z phase once (Yes) at Step S34, it is decided at Step S35 whether or not the linear encoder (5) detects the Z phase which is the position of the origin. When it is decided that the linear encoder detects the Z phase (Yes), the subject's origin returning condition is established, and the servo driver (10) stops moving the subject (4) at Step S36, and the controller (9) stops instructing and completes the subject's origin returning operation. On the other hand, if the rotary encoder (2) has not yet detected the Z phase at Step S34, the program returns to Step S31, and the above operation is repeated until the rotary encoder (2) detects the Z phase. In other words, it is understood from the flowchart shown in FIG. 1 that the condition of completing the subject's origin returning is that the rotary encoder (2) should detect the Z phase before the linear encoder (5) detects the Z phase.

Figure 2:
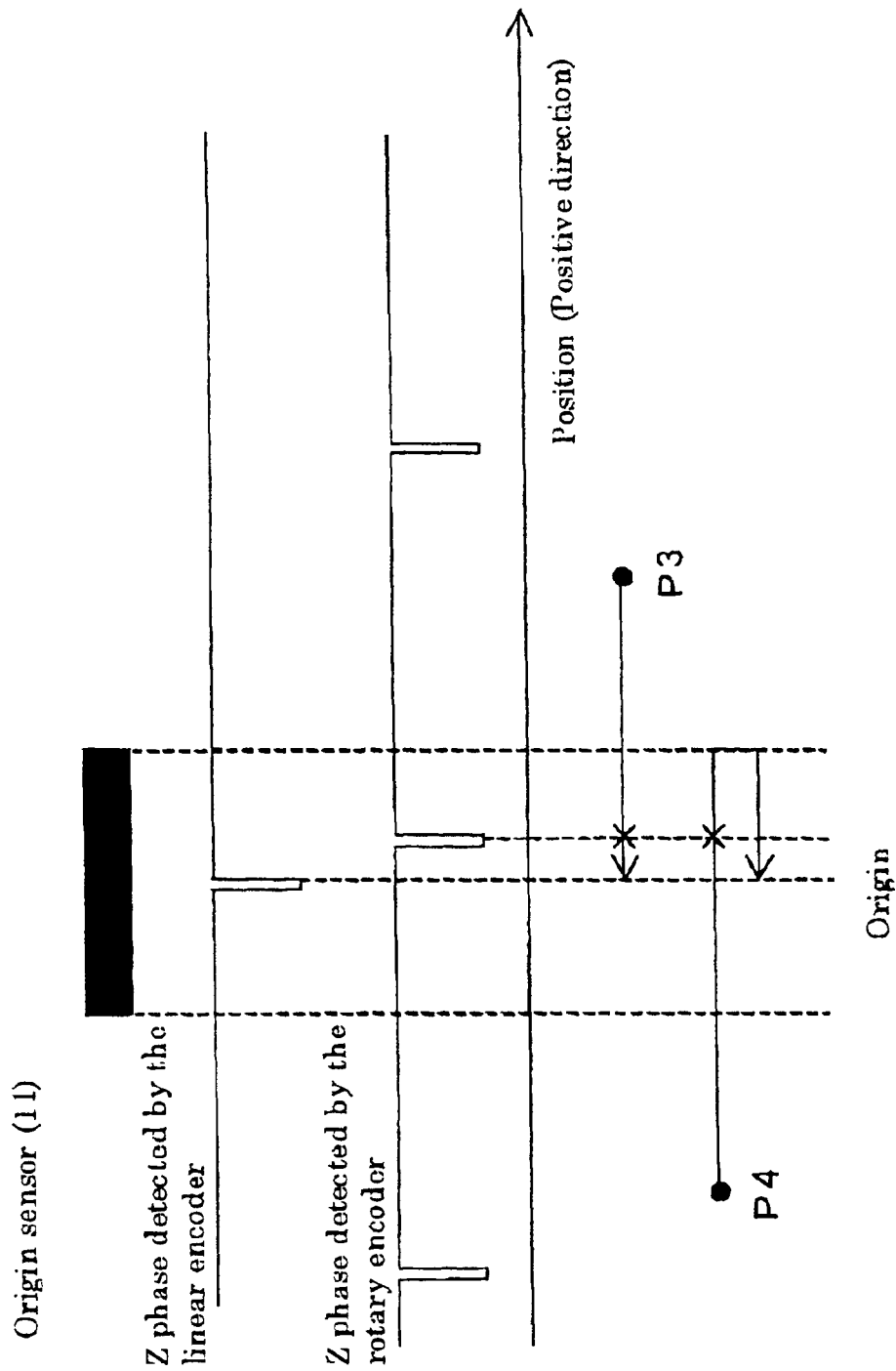
FIG. 2 is a timing diagram showing a mutual relationship between each of the components in the subject's origin returning operation illustrated in FIG. 1.

FIG. 2 illustrates different cases of a subject's origin returning operations, each of which is selected for use depending on differences in the mutual positional relationship between each Z phase to be detected by the rotary encoder (2) and the Z phase to be detected by the linear encoder (5) and the origin sensor (11), and the position of the subject (4) when the power supply is turned on, in the above origin returning operation. If the subject (4) is present at the position P3 on the drawing when the power supply is turned on and the moving direction is negative (direction from right to left on the drawing), the detection by the origin sensor (11), the detection of the Z phase by the rotary encoder (2) and the detection of the Z phase by the linear encoder (5) are achieved in this order while the subject (4) is moving for the origin returning operation, and this operation is completed at the position of the Z phase detected by the linear encoder (5). In this regard, the detection by the origin sensor (11) means that the origin sensor (11) shown in FIG. 8 detects the detection piece (8) attached to the moving member (7) (or the subject (4)) (in these cases, the origin sensor (11) enters the ON state, and the object (4) is located within the detectable region of the origin sensor (11) shown by a thick bar in the drawing) The detection of the Z phase by the rotary encoder (2) means that the rotary encoder (2) detects the Z phase indicating the origin of the servo motor (1); and the detection of the Z phase by the linear encoder (5) means that the linear encoder (S) detects the Z phase indicating the origin on the linear scale (6). In this case, the detection of the Z phase by the rotary encoder (2) (indicated by the notation X on FIG. 2) is achieved once before the subject returns to the origin, as mentioned above. Therefore, according to the flowchart shown in FIG. 1, the linear encoder (5) detects the Z phase (Yes) at Step S35 after the condition of Step S34 is established (Yes). Therefore, the normal subject's origin returning operation is possible at Step S36.

On the other hand, if the position of the subject (4) is at P4 on FIG. 2 when the power supply is turned on, and if the moving direction is positive (direction from left to right on the drawing), it is first detected that the subject (4) is within the detectable region of the origin sensor (11) by the detection of the ON state of the origin sensor (11) while the subject (4) is moving for returning to the origin. The subject (4) keeps moving even when the linear encoder (5) "detects" (i.e., encounters) the Z phase. In this regard, this "detection" of the Z phase by the linear encoder (5) is ignored, because the rotary encoder (2) has not yet detected the Z phase. In other words, the linear encoder does not indicate detection of the Z phase because the linear encoder is operable to only detect the Z phase after the rotary encoder detects the Z phase. Therefore, the condition of Step S34 in the flowchart of FIG. 1 is not established (No). Next, the servo motor (1) further rotates to move the subject (4) in the positive direction, while the rotary encoder (2) detects the Z phase (indicated by the notation X). This detection establishes the condition of Step S34 of the flowchart of FIG. 1 (Yes), and switches the driving mode of the servo motor (1) from the rectangular waveform pulse driving to the sine waveform pulse driving. After that, the subject (4) further moves in the positive direction, and the origin sensor (11) detects that the subject (4) is outside of the detectable region of the sensor (11). Then, the subject (4) is caused to move in the direction, (i.e., the negative direction) at Step S33 (direction from right to left on the drawing, that is, the returning direction toward the detectable region of the origin sensor (11)). Thus, as the subject (4) keeps moving, the rotary encoder (2) again detects the Z phase, and then, the linear encoder (5) detects the Z phase (Yes) at Step S35, whereby the subject's origin returning operation is completed, and the subject (4) is stopped at Step S36.

If the subject (4) is present at a position other than P3 and P4 when the power supply is turned on, various patterns are possible depending on the position of the subject (4) found at the time of starting the origin returning operation and depending on the subject's moving direction. However, according to the present invention, only by adding the condition: "the rotary encoder (2) should previously detect the Z phase" to the condition of completing the subject's origin returning operation, various patterns of operations are all successfully performed.

According to the subject's origin returning operation of the present embodiment, by adding the above condition that the rotary encoder (2) should previously detect the Z phase, the driving mode of the servo motor (1) is switched from the rectangular waveform pulse driving to the sine waveform pulse driving at this point of time when the rotary encoder (2) detects the Z phase. Therefore, the driving mechanism has no problem in high-acceleration or -deceleration and high-speed driving for positioning control after the completion of the subject's origin returning operation. Thus, the problem the prior art has suffered from may be eliminated.

Next, a positioning-controlling apparatus and a positioning-controlling method according to the second embodiment of the present invention are described with reference to the accompanying drawings. The arrangement of the positioning-controlling apparatus according to the present embodiment is similar to that of the prior art shown in FIG. 8. However, the subject's origin returning operation is carried out following the flowchart shown in FIG. 4.

In the first embodiment, the condition: "the rotary encoder (2) should previously detect the Z phase" is added to the condition of completing the subject's origin returning operation by the servo driver (10). Alternatively, instead of the addition of the above condition, the following method may be employed. That is, the subject's moving direction for returning to the origin is predetermined, and the position of the origin sensor (11), the position of the Z phase to be detected by the rotary encoder (2), and the position of the Z phase to be detected by the linear encoder (5) are adjusted based on the above predetermined moving direction. This adjustment makes it possible for the rotary encoder (2) to detect the Z phase before the linear encoder (5) detects the Z phase while the subject (4) is moving in the above predetermined direction within the origin sensor's detectable region for the subject's origin returning. Thus, the subject's origin returning is completed at a point of time when the linear encoder (5) detects the Z phase. This arrangement is further described with reference to FIGS. 3 and 4.

Figure 3:
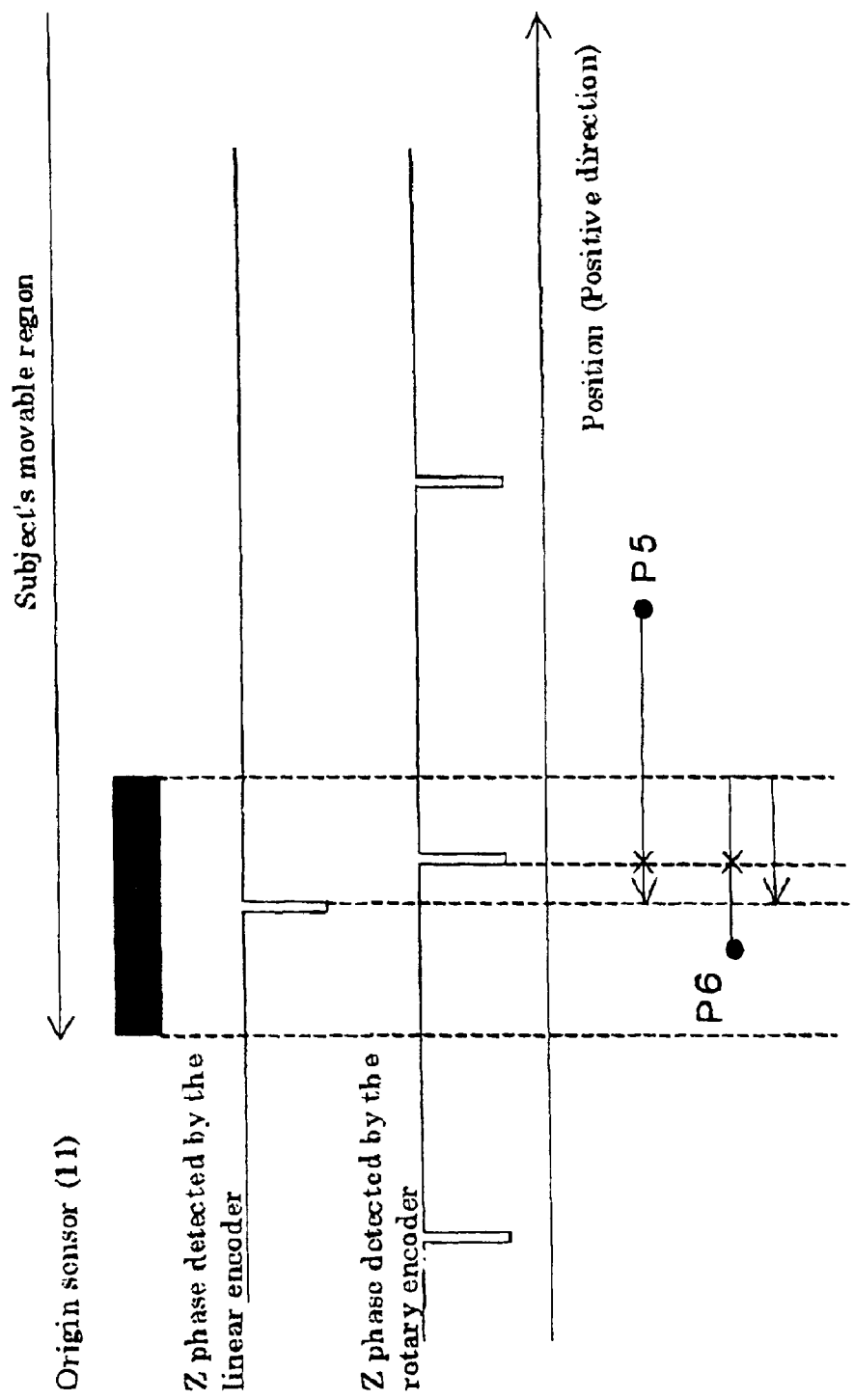
FIG. 3 is a timing diagram showing a mutual relationship between each of the components in the subject's origin returning operation in positioning control according to another embodiment of the present invention.

Referring to FIG. 3, the subject's moving direction for returning to the origin is adjusted to always be negative (right to left direction on the drawing). Adjustment is made so that the rotary encoder (2) can first detect the Z phase before the linear encoder (5) detects the Z phase, while the subject (4) is moving in the left direction within the detectable region of the origin sensor (11).

The present embodiment is applied as follows. As shown in FIG. 3, one end of the movable region of the subject (4) coincides with one end (the left-side end, in this example) of the detectable region of the origin sensor (11). In other words, the condition: "the origin position should be set at one end of the movable region of the subject (4)" is added. The reason for this addition is described below. Referring to the example shown in the drawing, if the origin sensor (11) is not arranged at the left-side end, disadvantageously, the subject (4) is moved to the left, which is a direction causing the subject (4) to move away from the origin sensor (11), because the above subject's initial moving direction at the start of the origin returning operation is set to be negative.

For example, if the subject (4) is present at the position P5 outside of the detectable region of the origin sensor (11), the detection of the ON state of the origin sensor (11), the detection of the Z phase by the rotary encoder (2), and the detection of the Z phase by the linear encoder (5) are achieved in this order while the subject (4) is moving, because the predetermined subject's moving direction for returning the origin is negative. The condition: "the rotary encoder (2) should previously detect the Z phase before the linear encoder (5) detects the Z phase" is satisfied and, thus, the intended subject's origin returning operation can be completed.

If the subject (4) is present at the position P6 within the detectable region of the origin sensor (11) at the start of the subject's origin returning operation, the subject's moving direction is first reversed from the predetermined subject's origin returning direction, that is, the subject's moving direction is turned to the positive direction (left to right direction on the drawing). The Z phase which is first detected by the linear encoder (5) during this subject's movement is ignored because the condition: "the rotary encoder (2) should previously detect the Z phase" is not satisfied and the subject is not moving in the direction for returning to the origin. Thus, the subject (4) is moved to leave the detectable region of the origin sensor (11). After that, the subject's moving direction is again reversed and turned to the negative direction (the direction for returning to the origin), and the detection of the ON state of the origin sensor (11), the detection of the Z phase by the rotary encoder (2), and the detection of the Z phase by the linear encoder (5) are achieved in this order in the same manner as in the previous case in which the subject (4) is present at the position P5 at the start of the subject's origin returning operation. Thus, the intended origin returning operation is completed.

Figure 4:
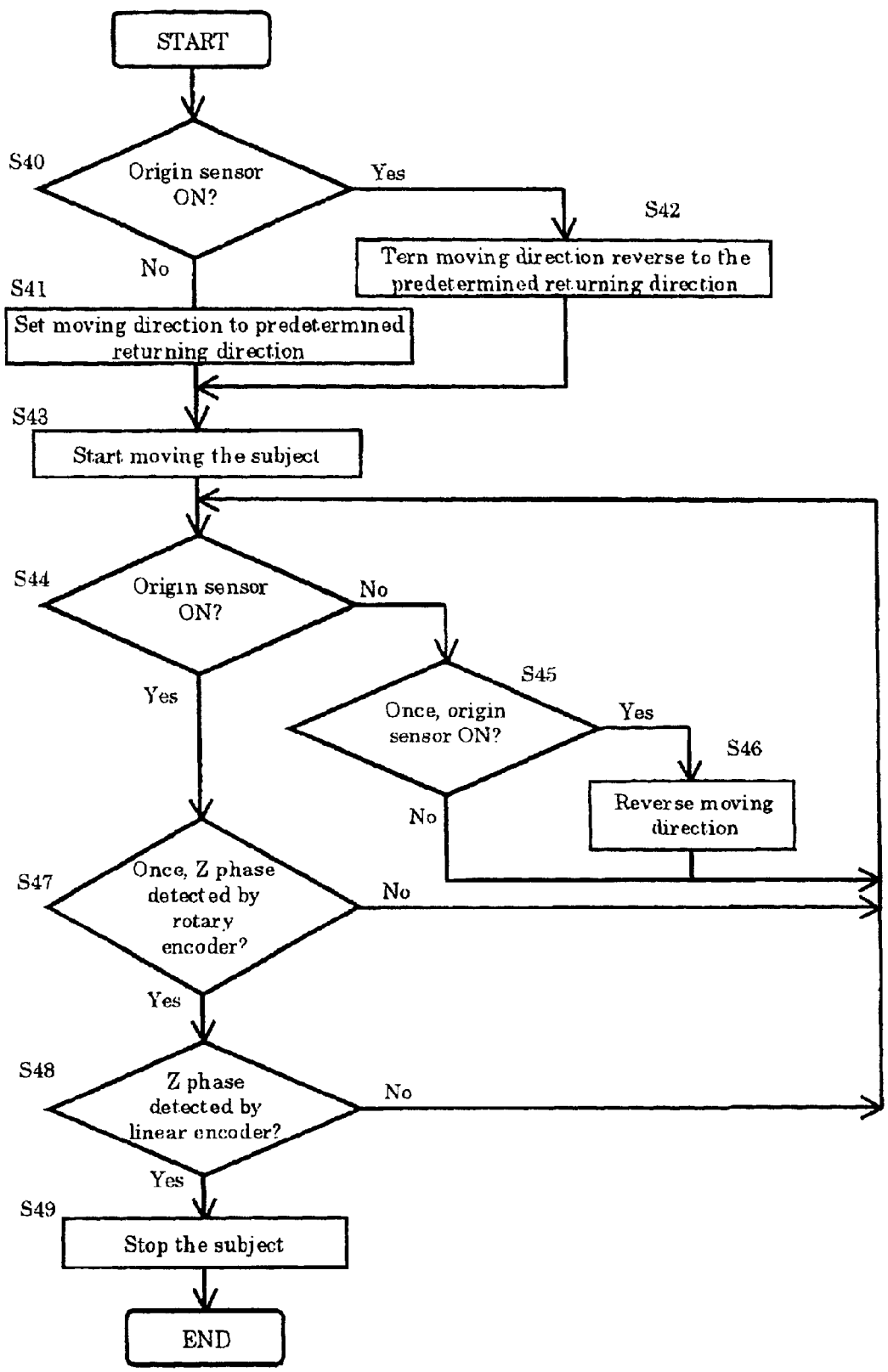
FIG. 4 shows a flowchart illustrating the subject's origin returning operation in the positioning control shown in FIG. 3.

The above operation is described with reference to the flowchart shown in FIG. 4.

At the start of the origin returning operation, it is decided at Step S40 whether or not the subject is within the detectable region of the origin sensor (11). If the subject is outside of the detectable region (No) (for example, the position P5), the normal subject's origin returning operation is carried out. That is, the subject's moving direction is the negative direction which is predetermined for returning to the origin (Step S41), and the origin sensor (11) detects the detection piece (i.e., the ON state) at Step S44, the rotary encoder detects the Z phase at Step S47, and the linear encoder detects the Z phase at Step S48 in this order. Thus, the subject's origin returning operation is completed at Step S49.

If the position of the subject (4) is within the detectable region of the origin sensor (11) (Yes) (for example, the position P6) at the start of the subject's origin returning operation at Step S40, the subject's moving direction is reversed from the predetermined origin returning direction (turned into the positive direction) at Step S42. Then, the subject is moved to leave (exit) the detectable region of the sensor (11) (No) at Step S44, and the subject's moving direction is again reversed (turned into the negative direction) at Step S46. After that, the detection of the ON state of the origin sensor (11), the detection of the Z phase by the rotary encoder (2), and the detection of the Z phase by the linear encoder (5) are achieved in this order at Steps S44 to S48, respectively, and the subject's origin returning operation is completed at Step S49.

In the foregoing positioning control according to the present embodiment, the condition: "the initial subject's moving direction at the start of the subject's origin returning operation is predetermined (the negative direction in this example)" is added. Needless to say, the subject's moving direction for returning to the origin may be set at positive, and adjustment may be made so that the detection of the Z phase by the rotary encoder (2), and the detection of the Z phase by the linear encoder (5) can be achieved in this order while the subject (4) is moving in the reverse direction (i.e., the positive direction).

Next, the third embodiment of the present invention is described with reference to the accompanying drawings.

Figure 8:
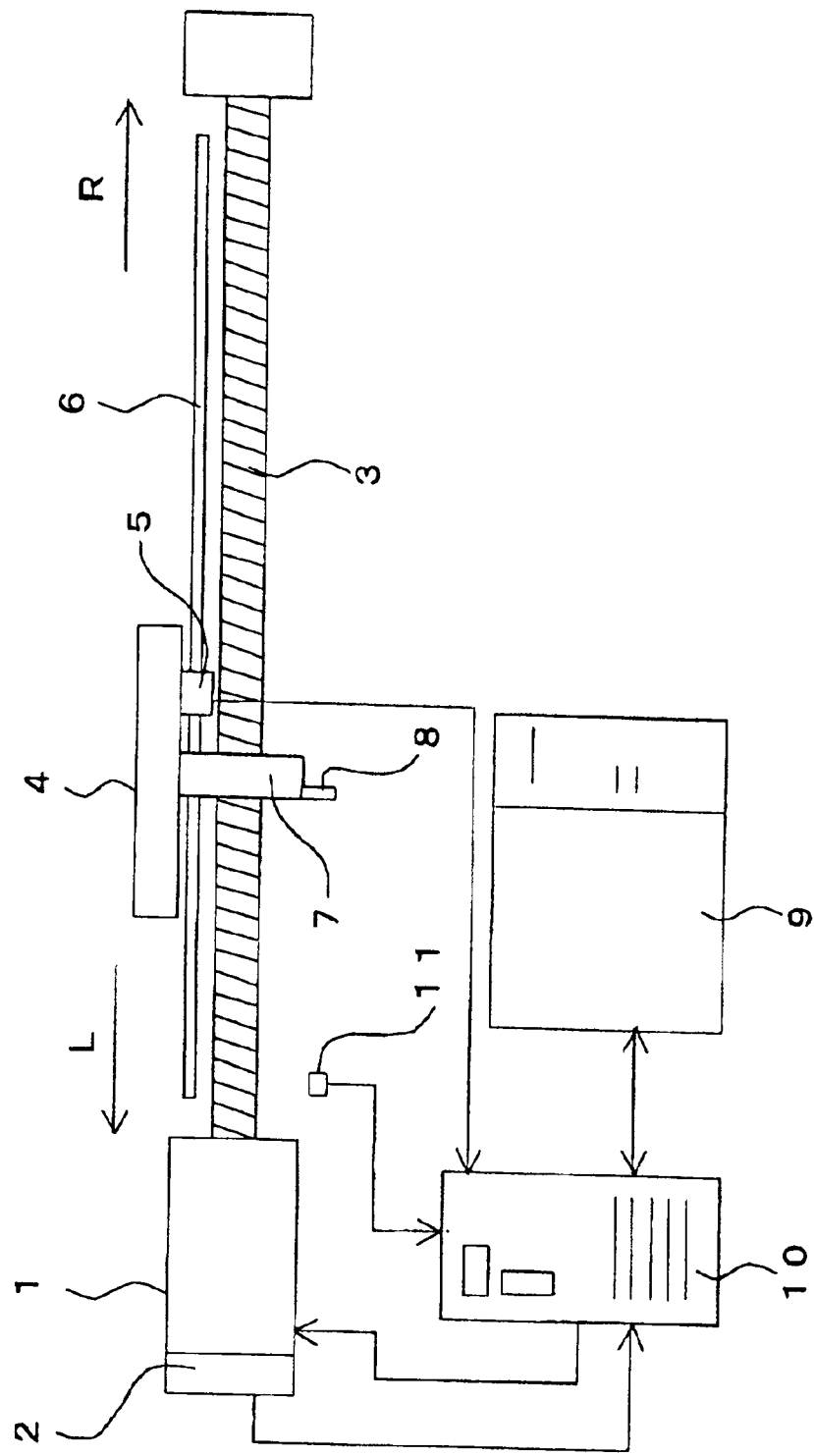
FIG. 8 is a schematic drawing showing a positioning-controlling apparatus according to the prior art.
Figure 9:
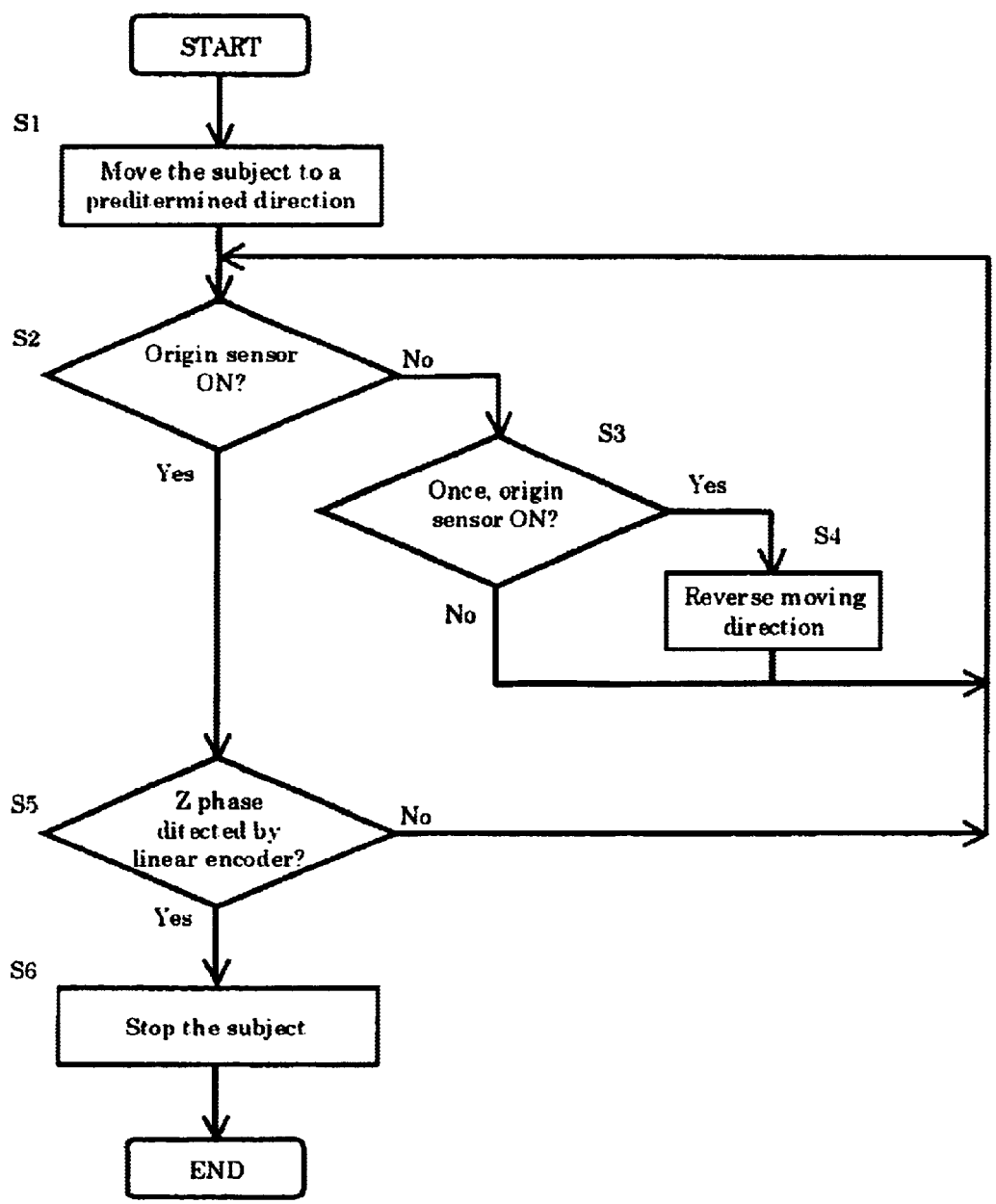
FIG. 9 shows a flowchart illustrating the subject's origin returning operation in positioning control according to the prior art.

The arrangement of a positioning-controlling apparatus according to the present embodiment is shown in FIG.8.

Figure 6:
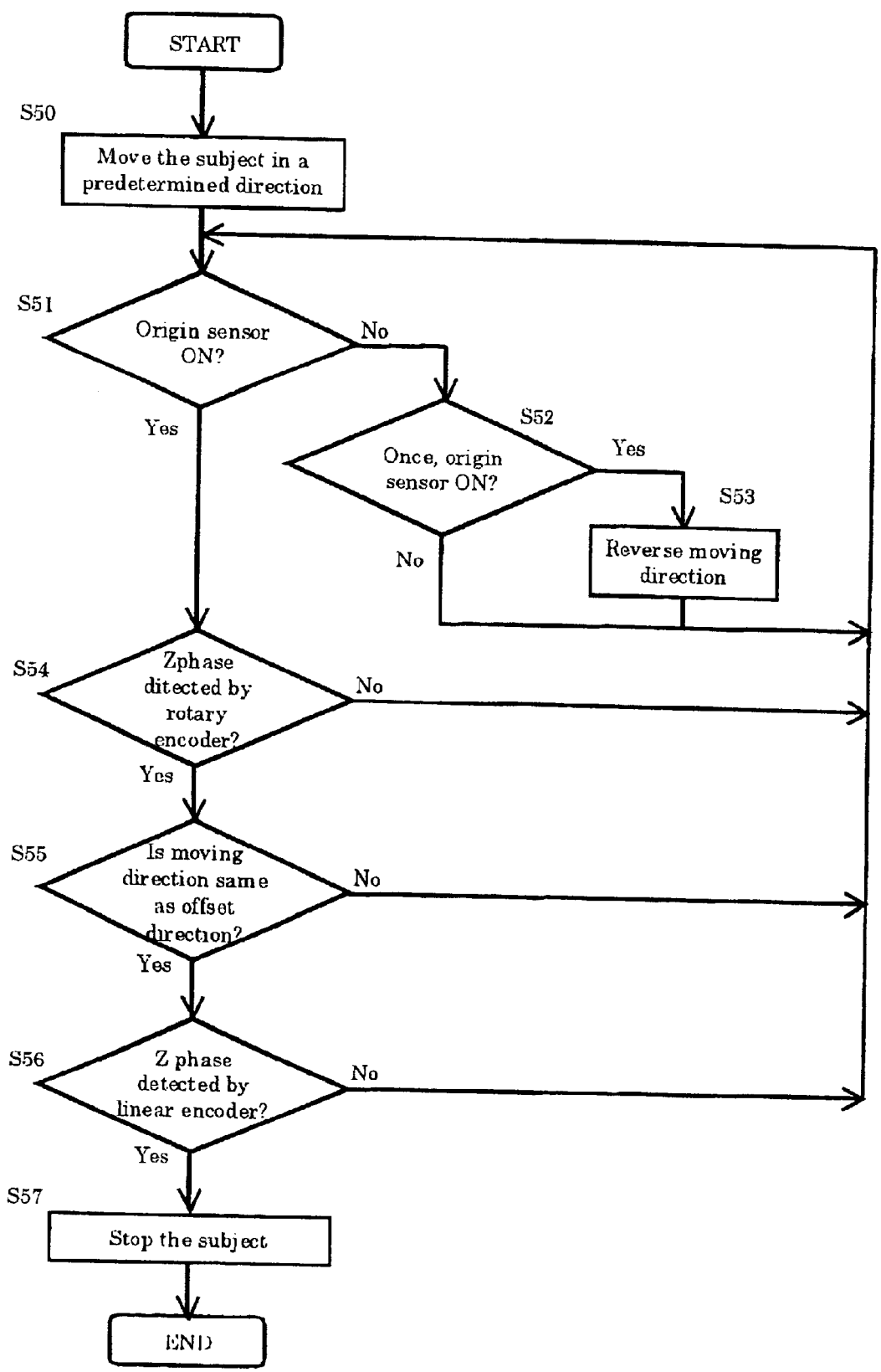
FIG. 6 shows a flowchart illustrating the subject's origin returning operation in the positioning control shown in FIG. 5.

However, the origin returning operation in positioning control by the controller (9) is carried out following the flowchart shown in FIG. 6. The difference between the present embodiment and the first embodiment rests in that, in the first embodiment, the driving mode is switched from the rectangular waveform pulse driving to the sine waveform pulse driving upon the detection of the Z phase by the rotary encoder (2) in the origin returning operation, while, in the present embodiment, the driving mode is switched from the rectangular waveform pulse driving to the sine waveform pulse driving upon the detection of the Z phase by the linear encoder (5) after the detection of the Z phase by the rotary encoder (2).

This different point is described with reference to FIGS. 5 and 6.

Figure 5:
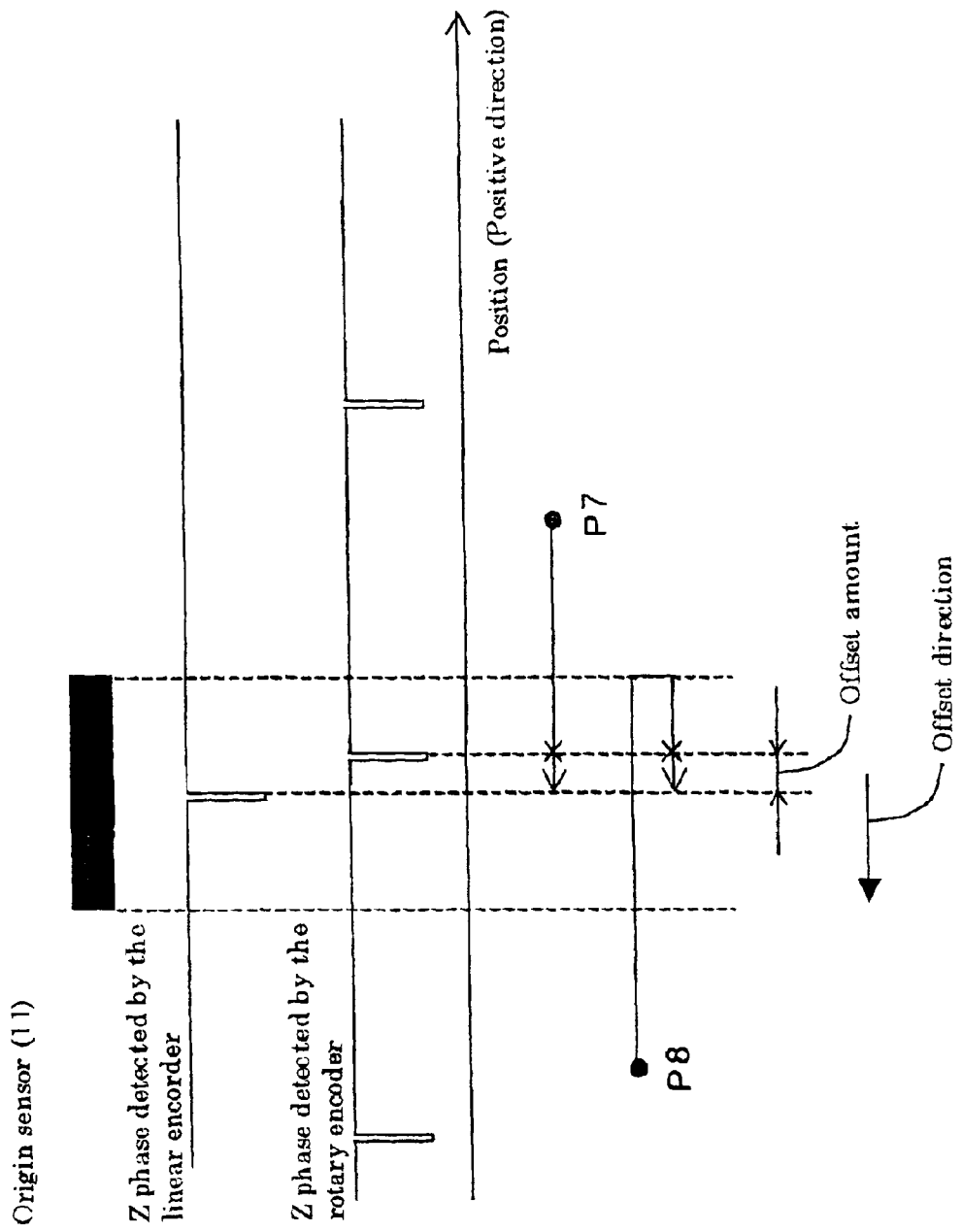
FIG. 5 is a timing diagram showing a mutual relationship between each of the components in the subject's origin returning operation in positioning control according to a further embodiment of the present invention.

An offset amount which is the distance the subject (4) moves from the position at which the Z phase is detected by the rotary encoder (2) to the position at which the Z phase is detected by the linear encoder (5) as shown in FIG. 5, and an offset direction which is the direction of the above subject's moving, are previously set and recorded on the controller (9).

For example, when the subject (4) moves in the negative direction (right to left direction on the drawing) from the position P7 shown in FIG. 5, the driving mode of the motor is not switched to the sine waveform pulse driving at the position where the rotary encoder (2) detects the Z phase (indicated by the notation X on FIG. 5 and Step S54 of the flowchart of FIG. 6), and the subject (4) keeps moving in the negative direction under the rectangular waveform pulse driving condition. If the subject's moving direction at this point of time coincides with the offset direction shown in the drawing (right to left direction on the drawing) (indicated by Step S55 of the flowchart on FIG. 6), the driving mode is switched from the rectangular waveform pulse driving to the sine waveform pulse driving at the position where the linear encoder (5) detects the Z phase (indicated by Step S56 of the flowchart on FIG. 6), and the subject (4) stops moving. In this stage, when (or just before) the subject (4) has moved by the previously recorded offset amount from the position where the rotary encoder (2) detected the Z phase, the driving mode is switched to the sine waveform pulse driving such that the position at which the rotary encoder (2) detects the Z phase corresponds to the timing of the rise of the sine waveform pulse.

Next, while the subject (4) is moving in the positive direction (left to right direction on the drawing) from the position P8 shown in FIG. 5, the ON state of the origin sensor (11) is first detected, and the subject (4) keeps moving even when the linear encoder (5) detects the Z phase. This is because this detection of the Z phase by the linear encoder (5) is done before the rotary encoder (2) detects the Z phase and this detection is ignored as has already been described with respect to the first embodiment. Thus, the subject (4) further moves in the positive direction, while the rotary encoder (2) detects the Z phase. This detection of the Z phase by the rotary encoder (2) is also ignored, because the subject's moving direction at this point of time is opposite to the offset direction shown in the drawing (indicated by Step S55 of the flowchart on FIG. 6). After that, the subject (4) further moves in the positive direction to leave the detectable region of the origin sensor (11), and then, the subject' moving direction is reversed and the subject (4) moves in the negative direction (right to left direction on the drawing). This subject's moving direction coincides with the offset direction. Hereinafter, the operation is executed in the same manner as in the former example in which the subject (4) moves from the position P7. That is, the rotary encoder (2) detects the Z phase (indicated by the notation X), however, the driving mode is not switched to sine waveform pulse driving, and the subject (4) keeps moving in the negative direction still under the rectangular waveform pulse driving. The driving mode is then switched from the rectangular waveform pulse driving to the sine waveform pulse driving at the position at which the linear encoder (5) detects the Z phase (indicated by Step S56 of the flowchart on FIG. 6). Thus, the subject (4) stops moving.

The flowchart on FIG. 6 illustrating the above subject's origin returning operation is different from the flowchart on FIG. 1 illustrating the first embodiment in that Step S55 is added to the flowchart on FIG. 1. In detail, if, at Step S55, the subject (4) is moving in the direction opposite to the offset direction which is previously inputted on the controller (9) (No), the detection of the Z phase by the rotary encoder (2) at Step S54 (Yes) is ignored, and the subject (4) keeps moving. Then, when the subject's moving direction is reversed at Step S53, and when this moving direction is the same as the above offset direction, the rotary encoder first detects the Z phase at Step S54 (Yes), and the subject (4) moves by the previously inputted offset amount. Then, the linear encoder (5) detects the Z phase at Step S56 (Yes), and the origin returning operation is completed at Step S57. The switching from the rectangular waveform pulse driving to the sine waveform pulse driving is done at a timing when the linear encoder (5) detects the Z phase at Step S56, or the subject (4) has moved by the offset amount after the rotary encoder detects the Z phase.

According to the subject's origin returning operation of the present embodiment, the subject (4) is moved under the rectangular waveform pulse driving until the linear encoder (5) detects the Z phase. Therefore, simple driving control is possible until the subject (4) is stopped by the completion of the origin returning operation.

Although, in this embodiment, the offset amount which is the distance the subject (4) moves from the position where the rotary encoder (2) detects the Z phase to the position where the linear encoder (5) detects the Z phase is inputted, the position where the rotary encoder (2) detects the Z phase or the position where the linear encoder (5) detects the Z phase may be adjusted so that the offset amount can be any predetermined amount (for example, zero).

Figure 7:
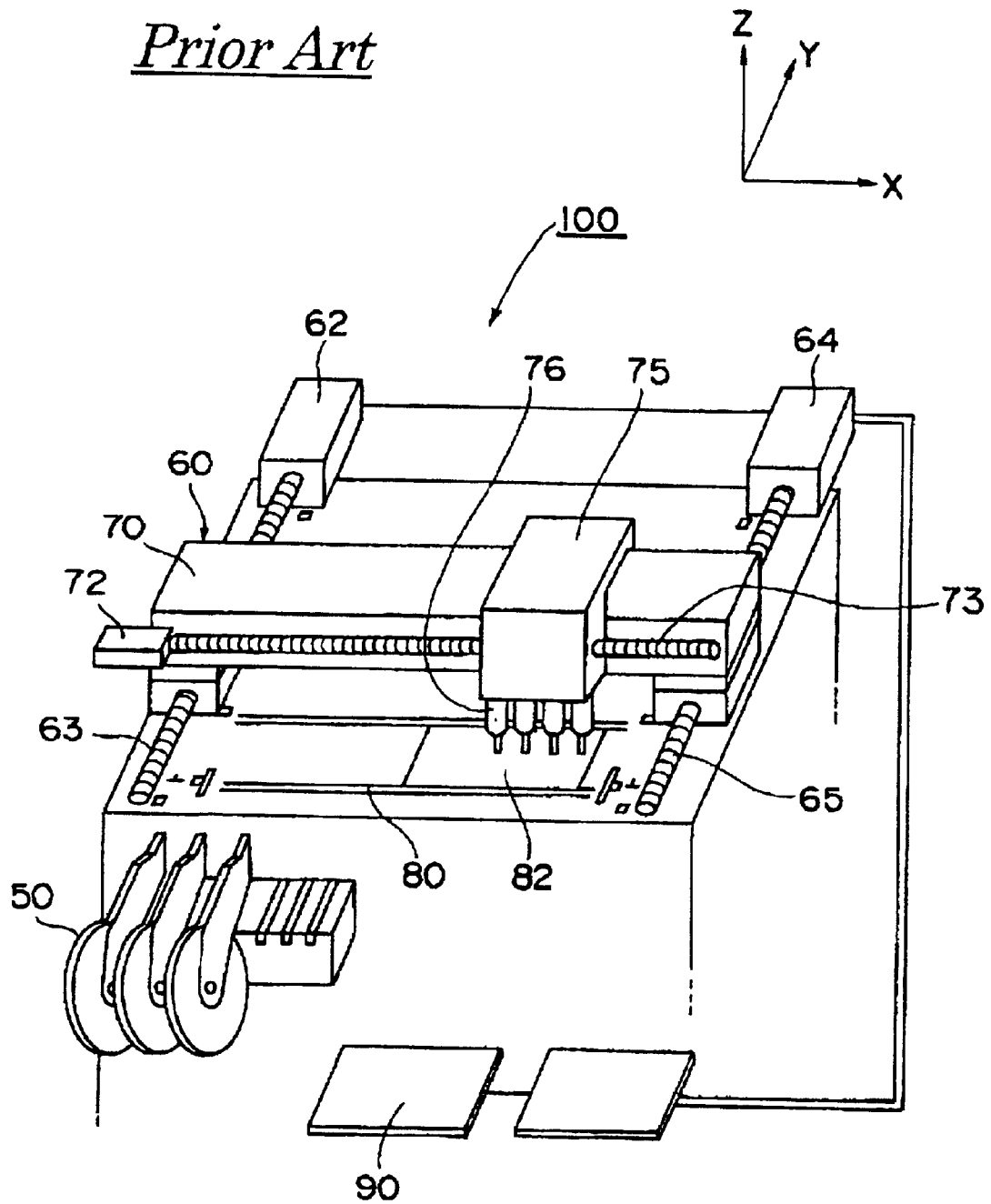
FIG. 7 is a schematic drawing showing part-mounting equipment according to the prior art.

Next, the fourth embodiment according to the present invention is described. The present embodiment is to apply the positioning-controlling methods and the positioning-controlling apparatuses of the first, second and third embodiments to a part-mounting method and part-mounting equipment. As has been already described with reference to FIG. 7, in the part-mounting equipment, a part taken out of the part-supplying unit (50) by the mounting head (75) is carried by the robot (60) and mounted on a mounting position on a circuit-formed material (82) regulated and held at a predetermined position by the circuit-formed material-holding device (80). The part held by the mounting head (75) is needed to be accurately positioned at the mounting position by the robot (60). According to the present embodiment, a part-mounting method and part-mounting equipment both capable of positioning the part with high reliability and stability are provided by applying the positioning-controlling methods and the positioning-controlling apparatuses of the foregoing embodiments to the X-direction driving unit or the Y-direction driving unit, or both of them, which constitute the robot (60).

In this regard, other than the above part-mounting equipment, there is an index type part-mounting system that can mount parts continuously and at high speed by using an index which intermittently rotates a plurality of sucking nozzles which are arranged circle-like on the robot (60). In this index type part-mounting system, the positions on which the parts sucked by the sucking nozzles are to be mounted are specifically determined. Therefore, the circuit-formed material-holding device (80) for holding the circuit-formed material (82) is to be moved in the X or Y direction, and the mounting position of the circuit-formed material (82) is positioned in accordance with the specified position of the part. In this case, the positioning-controlling apparatus and the positioning-controlling mechanism of each of the foregoing embodiments may be applied to the mechanism for moving the circuit-formed material-holding device. By doing so, a highly reliable and stable part-mounting method and part-mounting system can be provided. In another part-mounting system, for example, a part is moved only in the direction X shown in FIG. 7, and a circuit-formed material is moved only in the direction Y so as to position both the part and the circuit-formed material. In this way, it is possible to make positioning by utilizing a moving means for variously combined patterns. The positioning-controlling methods and the positioning-controlling apparatuses of the above embodiments also can be applied to such various types of moving means.

Figure 10:
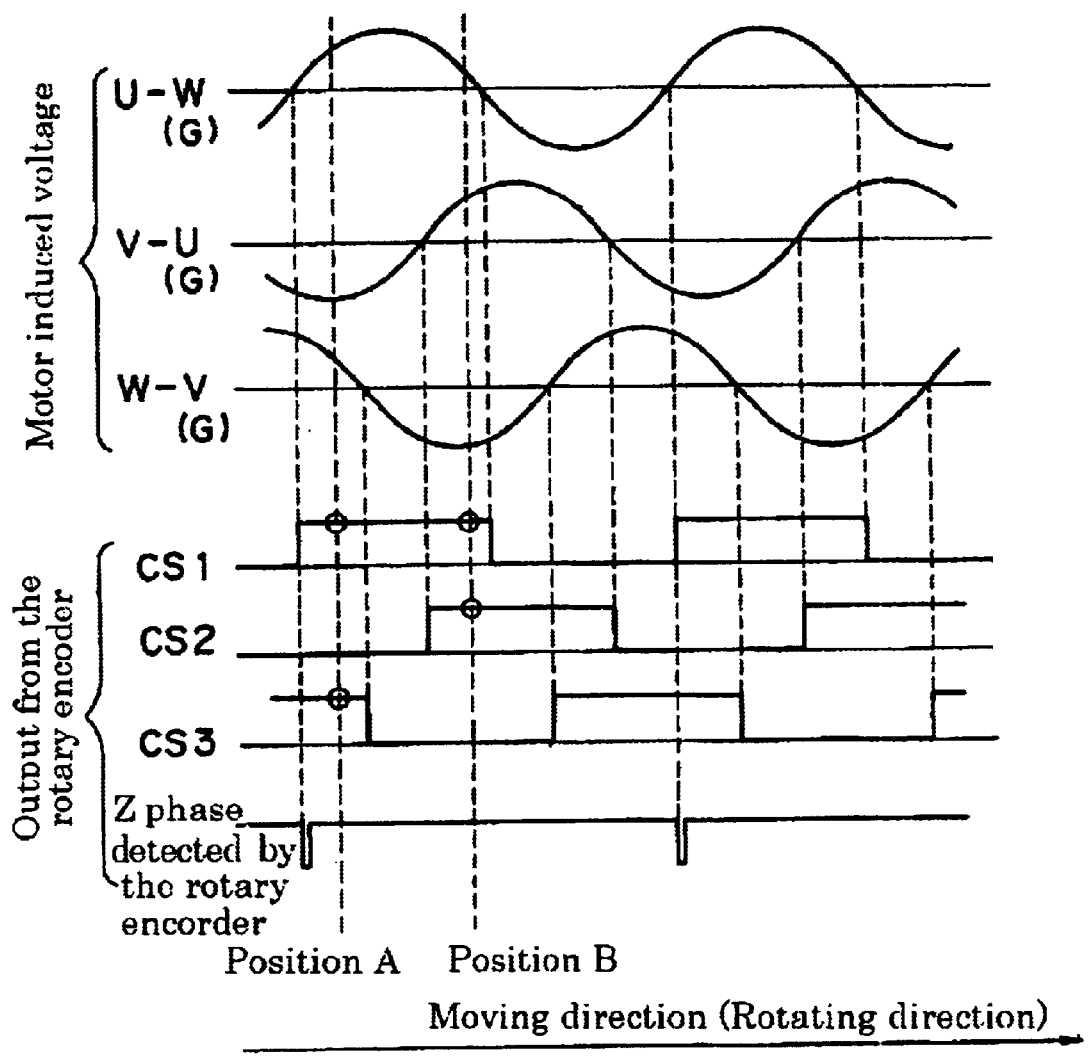
FIG. 10 is a diagram illustrating a servo motor-driving method according to the prior art.
Figure 11:
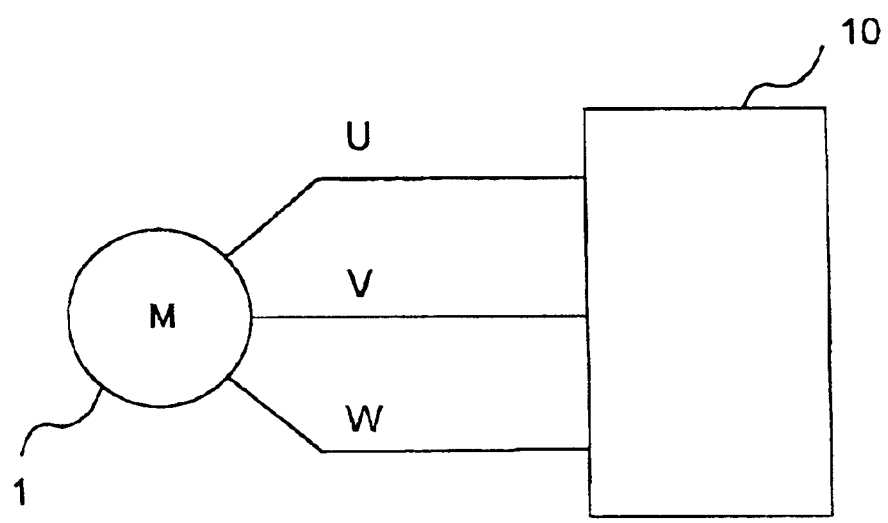
FIG. 11 is a diagram illustrating the constitution of a servo motor operated under three-phase driving.
Figure 12:
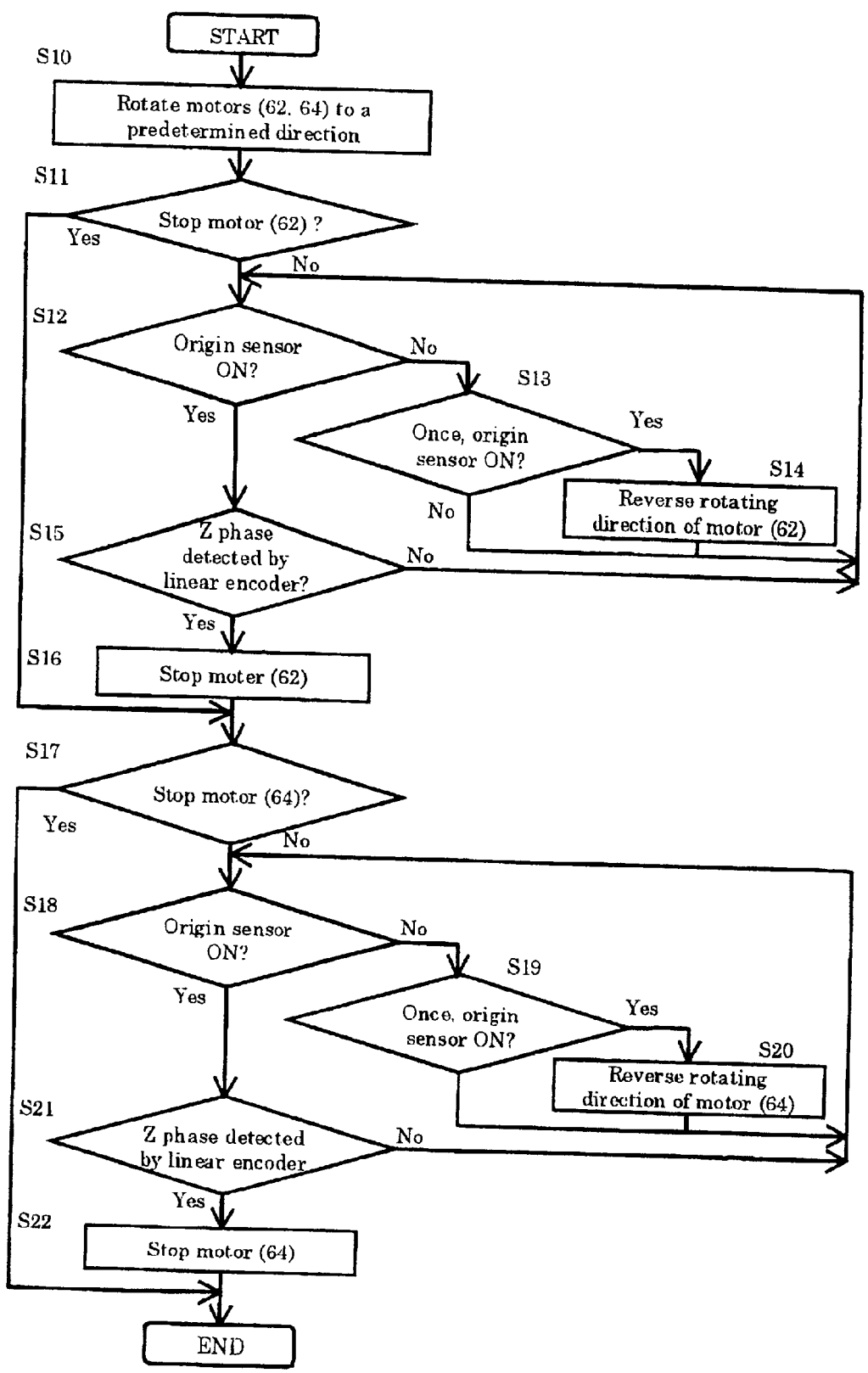
FIG. 12 shows a flowchart illustrating the subject's origin returning operation under twin-axial driving, in the part-mounting equipment shown in FIG. 7.
Figure 13:
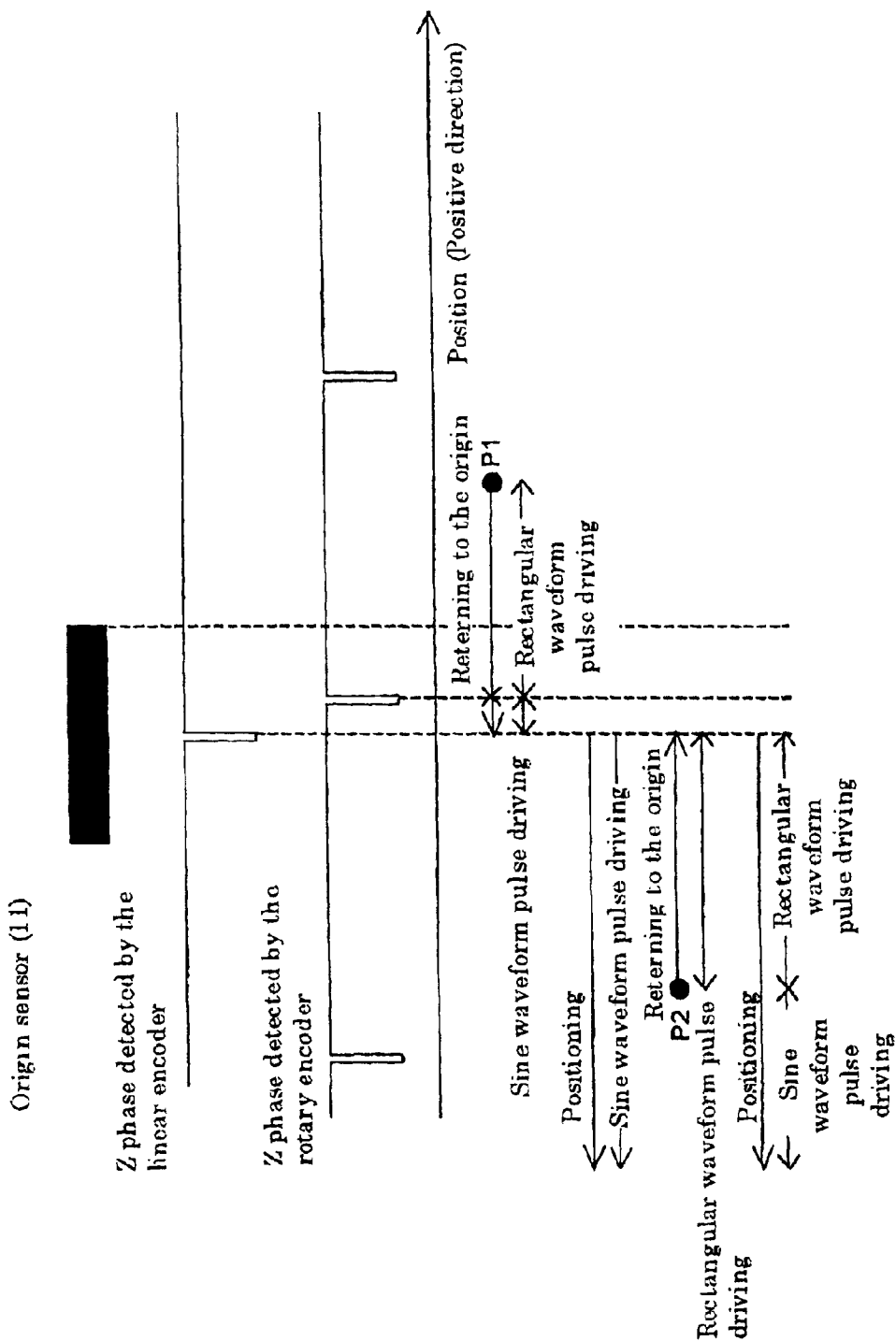
FIG. 13 is a timing diagram showing a mutual relationship between each of the components in the subject's origin returning operation shown in FIG. 12.

In the positioning controls of the respective embodiments according to the present invention described above, the position of the Z phase detected by the rotary encoder (2) is defined as the electrical origin. However, the scope of the present invention is not limited to this manner. For example, the positioning control of the present invention can be applied to the method of detecting an electrical origin by using only a CS signal as disclosed in Japanese Laid-Open Patent Publication No. 61-39885/1986. That is, the following conditions may be added: a condition that the origin returning operation should be completed after the electrical origin of a CS signal obtained from the rotary encoder (2) (for example, timing of the rise of the pulse of CS1 shown in FIG. 10 is defined as the origin) is detected in advance (the alternate of the first embodiment), or a condition that the origin returning operation should be completed as follows. The subject's moving direction for returning to the origin is fixed, and the electrical origin of a CS signal obtained from the rotary encoder is first detected while the subject moves along this fixed direction. Then, the origin returning operation is completed when the linear encoder (5) detects the Z phase (the alternative of the second embodiment). By adding such a condition as described above, there can be produced a similar effect to those of the above embodiments in which the Z phase detected by the rotary encoder (2) is defined as the electrical origin.

In the foregoing description, the application of the positioning control according to the present invention is applied to the positioning control in part-mounting equipment. However, the present invention is not limited to this, and the present invention can be widely applied to general positioning controls in which subjects are carried to predetermined positions for positioning control, such as positioning control of workpieces in a transfer machine which sequentially conveys the workpieces and positions them at predetermined positions for working them, or positioning control of the components of a precision instrument by an automatic assembling machine, etc.

According to the positioning-controlling apparatuses and the positioning-controlling methods of the present invention, the subject's origin returning operation is completed after the detection of the Z phase by the rotary and linear encoder.

Therefore, the subject's origin returning operation can be completed under the condition in which the servo motor is surely driven according to sine waveform pulses. Therefore, the high-acceleration and high-speed positioning operation following the completion of the subject's origin returning operation can be performed under the sine waveform pulse driving from the start. Thus, it becomes possible to avoid abnormal noises and pulsating velocity which would be caused by discontinuous changes in torque in association with the switching from the rectangular waveform pulse driving to the sine waveform pulse driving, as is often the case with the conventional positioning-controlling apparatus.

Further, the above discontinuous changes in torque are eliminated from the multiple axes of part-mounting equipment on which high-accuracy multi-axial synchronous control is required to be made. Therefore, the frame which is synchronously controlled together may not be twisted. Thus, no adverse influence impacts the accuracy and the lifetime of the equipment.

By applying the positioning-controlling method or the positioning-controlling apparatus of the present invention to a part-mounting method or part-mounting system, the positioning of parts or a circuit-formed material can be made with high reliability and stability. Thus, there can be provided a part-mounting method or part-mounting system capable of producing an electronic circuit substrate with high precision and stability in positioning.

What is claimed is:

1. A positioning-controlling apparatus comprising:
   a servo motor;
   a servo driver for controlling an operation of said servo motor;
   a rotary encoder for detecting an amount of rotation of said servo motor;
   a moving mechanism driven by said servo motor so as to move an object;
   a linear encoder for detecting an amount of movement of said moving mechanism; and
   an origin sensor for detecting whether the object to be moved by said moving mechanism is located within a detectable region;
   wherein said servo driver is operable to:
      detect a commutation signal phase, from said rotary encoder, for driving said servo motor;
      generate an electrical current instruction with rectangular waveform pulses based on the commutation signal phase from said rotary encoder until said rotary encoder detects a Z phase or until said linear encoder detects a Z phase;
      after said rotary encoder detects the Z phase or said linear encoder detects the Z phase, generate an electrical current instruction with sine waveform pulses based on the detected Z phase, thereby switching a driving mode of said servo motor from rectangular waveform pulses to sine waveform pulses;
      at a beginning or resumption of operation, control said servo motor so that said moving mechanism returns the object to an origin position corresponding to a position of the Z phase detected by said linear encoder; and
      after the object is moved to the origin position, control said servo motor so that said moving mechanism moves the object to a required position and keeps the object at the required position; and wherein, while said servo driver is controlling said servo motor so that said moving mechanism is returning the object to the origin position, and when said origin sensor first detects that the object is located within the detectable region, said linear encoder is operable to detect the Z phase only after said rotary encoder detects the Z phase.

2. The positioning-controlling apparatus of claim 1, wherein while said servo driver is controlling said servo motor so that said moving mechanism returns the object to the origin position, and when said origin sensor first detects that the object is located within the detectable region, if said linear encoder encounters the Z phase before said rotary encoder detects the Z phase, said servo driver is operable to control said servo motor so that said moving mechanism moves the object in a forward direction out of the detectable region, and so that said moving mechanism then moves the object in a reverse direction back into the detectable region.

3. The positioning-controlling apparatus of claim 1, wherein said servo driver is operable to control said servo motor so that said moving mechanism returns the object to the origin position by moving the object in a predetermined direction, said origin sensor, said rotary encoder, and said linear encoder being arranged so that said origin sensor first detects that the object is within the detectable region, then said rotary encoder detects the Z phase, and then said linear encoder detects the Z phase while the object is moved in the predetermined direction.

4. The positioning-controlling apparatus of claim 3, wherein said servo driver is operable to control said servo motor so that said moving mechanism moves the object between a first end of a movable region and a second end of the movable region, said origin sensor being operable to detect whether the object is located within a detectable region having a first end and having a second end coinciding with the second end of the movable region, said rotary encoder and said linear encoder being arranged so that first said rotary encoder detects the Z phase and then said linear encoder detects the Z phase while the object is moved from the first end of the detectable region to the second end of the detectable region.

5. The positioning-controlling apparatus of claim 3, wherein, when the object is outside of the detectable region at the beginning or the resumption of operation, said servo driver is operable to control said servo motor so that said moving mechanism returns the object to the origin position by moving the object in a predetermined direction.

6. The positioning-controlling apparatus of claim 3, wherein, when the object is within the detectable region at the beginning or the resumption of operation, said servo driver is operable to control said servo motor so that said moving mechanism returns the object to the origin position by initially moving the object in a reverse direction opposite the predetermined direction so that said moving mechanism moves the object out of the detectable region, and then by moving the object in the predetermined direction so that said moving mechanism returns the object into the detectable region.

7. The positioning-controlling apparatus of claim 1, wherein a position where said rotary encoder detects the Z phase and a position where said linear encoder detects the Z phase are spaced apart a predetermined offset amount, and wherein said servo driver is operable to control said servo motor so that said moving mechanism moves the object in a predetermined offset direction from the position where said rotary encoder detects the Z phase to the position where said linear encoder detects the Z phase, said servo driver being operable to stop generating an electrical current instruction with rectangular waveform pulses and begin generating an electrical current instruction with sine waveform pulses so as to switch the driving mode of said servo motor when the object is moved from the position where the rotary encoder detects the Z phase in the offset direction by the offset amount.

8. A part-mounting system comprising:
    a circuit-formed material-holding device for carrying and holding a circuit-formed material;
    a part-supplying unit for supplying parts;
    a mounting head operable to take a part out of said part-supplying unit and mount the part on the circuit-formed material held by said circuit-formed material-holding device;
    a robot for carrying said mounting head; and
    a controller for controlling said circuit-formed material-holding device, said part-supplying unit, said mounting head, and said robot such that the part taken out of said part-supplying unit by said mounting head is mounted on a predetermined mounting position of the circuit-formed material; and
    wherein at least one of said robot and said circuit-formed material-holding device comprises a positioning-controlling apparatus for positioning the part at the predetermined mounting position of the circuit-formed material, said positioning-controlling apparatus including:
        a servo motor;
        a servo driver for controlling an operation of said servo motor;
        a rotary encoder for detecting an amount of rotation of said servo motor;
        a moving mechanism driven by said servo motor so as to move an object;
        a linear encoder for detecting an amount of movement of said moving mechanism; and
        an origin sensor for detecting whether the object to be moved by said moving mechanism is located within a detectable region;
    wherein said servo driver is operable to:
        detect a commutation signal phase, from said rotary encoder, for driving said servo motor;
        generate an electrical current instruction with rectangular waveform pulses based on the commutation signal phase from said rotary encoder until said rotary encoder detects a Z phase or until said linear encoder detects a Z phase;
        after said rotary encoder detects the Z phase or said linear encoder detects the Z phase, generate an electrical current instruction with sine waveform pulses based on the detected Z phase, thereby switching a driving mode of said servo motor from rectangular waveform pulses to sine waveform pulses;
        at a beginning or resumption of operation, control said servo motor so that said moving mechanism returns the object to an origin position corresponding to a position of the Z phase detected by said linear encoder; and
        after the object is moved to the origin position, control said servo motor so that said moving mechanism moves the object to a required position and keeps the object at the required position; and
    wherein while said servo driver is controlling said servo motor so that said moving mechanism is returning the object to the origin position, and when said origin sensor first detects that the object is located within the detectable region, said linear encoder is operable to detect the Z phase only after said rotary encoder detects the Z phase.

9. The part-mounting system of claim 8, wherein one of said robot and said circuit-formed material-holding device includes a multi-axial driving unit for synchronous operation using a plurality of servo motors so that a respective one of said mounting head and the circuit-formed material can be carried in the predetermined direction.

10. A positioning-controlling method comprising:
providing a rotary encoder for detecting a rotation amount of a servo motor;
providing a linear encoder for detecting an amount of movement of an object;
driving the servo motor according to a current instruction with rectangular waveform pulses based on a commutation signal phase from a rotary encoder until the rotary encoder detects a Z phase or the linear encoder detects a Z phase;
after the rotary encoder detects the Z phase or the linear encoder detects the Z phase, switching the driving mode of the servo motor to a driving mode according to a current instruction with sine waveform pulses based on the detected Z phase;
returning the object to the origin position corresponding to the position of the Z phase detected by the linear encoder, wherein while the object is being returned to the origin position, an origin sensor first detects that the object is within a detectable region of the origin sensor, and then the rotary detector detects the Z phase prior to detection of the Z phase by the linear detector within the detectable region; and
moving the object from the origin position to a required position.

11. The positioning-controlling method of claim 10, wherein said returning of the object to the origin position includes moving the object in a predetermined moving direction, and includes arranging the origin sensor, the rotary encoder, and the linear encoder so that the origin sensor first detects that the object is within the detectable region, the rotary encoder then detects the Z phase, and the linear encoder then detects the Z phase after detection of the Z phase by the rotary detector, while the object is being moved in the predetermined moving direction.

12. A part-mounting method comprising:
removing a part from a part-supplying unit;
regulating and holding a circuit-formed material using a holding device;
carrying the part to a mounting position of the circuit-formed material using a mounting head;
positioning the part at the mounting position; and
mounting the part at the mounting position;
wherein at least one of said regulating and holding of the circuit-formed material and said carrying and positioning of the part comprises a positioning-controlling method to position the part at the predetermined mounting position of the circuit-formed material, said positioning-controlling method including:
providing a rotary encoder for detecting a rotation amount of a servo motor;
providing a linear encoder for detecting an amount of movement of an object;
driving the servo motor according to a current instruction with rectangular waveform pulses based on a commutation signal phase from a rotary encoder until the rotary encoder detects a Z phase or the linear encoder detects a Z phase;
after the rotary encoder detects the Z phase or the linear encoder detects the Z phase, switching the driving mode of the servo motor to a driving mode according to a current instruction with sine waveform pulses based on the detected Z phase;
returning the object to the origin position corresponding to the position of the Z phase detected by the linear encoder, wherein while the object is being returned to the origin position, an origin sensor first detects that the object is within a detectable region of the origin sensor, and then the rotary detector detects the Z phase prior to detection of the Z phase by the linear detector within the detectable region; and
moving the object from the origin position to a required position.

* * * * *